United States Patent [19]

Hoffman

[11] Patent Number: 4,532,501
[45] Date of Patent: Jul. 30, 1985

[54] CAPACITIVELY COUPLED MACHINE TOOL SAFETY SYSTEM

[75] Inventor: Gary R. Hoffman, Glen Arm, Md.

[73] Assignee: E. I. Du Pont de Nemours and Company, Wilmington, Del.

[21] Appl. No.: 345,193

[22] Filed: Feb. 2, 1982

[51] Int. Cl.³ .............................................. G08B 21/00
[52] U.S. Cl. .................................... 340/679; 192/130;
340/539; 340/540; 340/573; 340/180; 361/182;
361/187
[58] Field of Search ............... 340/679, 680, 573, 540,
340/539; 192/130, 129 A; 361/182, 187

[56] References Cited

U.S. PATENT DOCUMENTS

| | | |
|---|---|---|
| 1,847,872 | 3/1932 | Hand . |
| 3,409,842 | 11/1968 | Embling et al. .................. 331/65 |
| 3,872,455 | 3/1975 | Fuller et al. .................. 340/189 M |
| 3,896,425 | 7/1975 | Erichsen .......................... 340/258 B |
| 3,950,755 | 4/1976 | Westbrook, Sr. .................. 343/225 |
| 3,961,323 | 6/1976 | Hartkorn .......................... 340/539 |
| 3,983,483 | 9/1976 | Pando ................................ 325/16 |
| 4,027,276 | 5/1977 | Shaughnessy .................... 340/539 |
| 4,057,805 | 11/1977 | Dowling ............................ 343/225 |
| 4,075,961 | 2/1978 | Harris ............................... 112/277 |
| 4,095,214 | 6/1978 | Minasy .......................... 340/358 C |

Primary Examiner—Glen R. Swann, III
Attorney, Agent, or Firm—George M. Medwick

[57] ABSTRACT

A safety system for a machine tool is characterized by a capacitively coupled electric field generator (transmitter) and a capacitive receptor antenna. An electrical signal is induced in the capacitive receptor antenna by the action of the electric field. The magnitude of the induced signal is monotonically related to the distance between the electric field generator and the capacitive receptor antenna. When the magnitude of the electrical signal exceeds a predetermined threshold, a machine tool safety indicator is developed.

21 Claims, 36 Drawing Figures

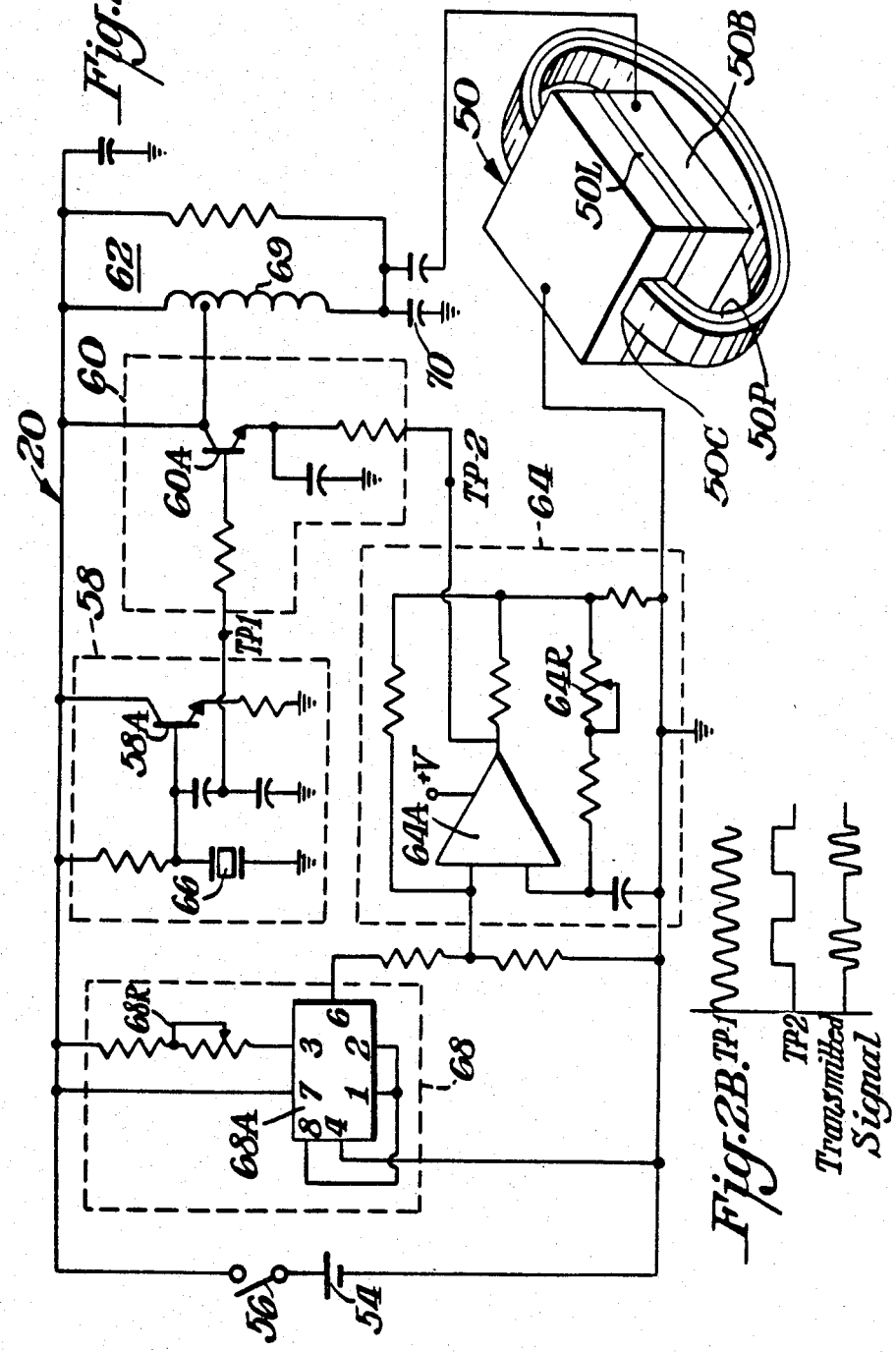

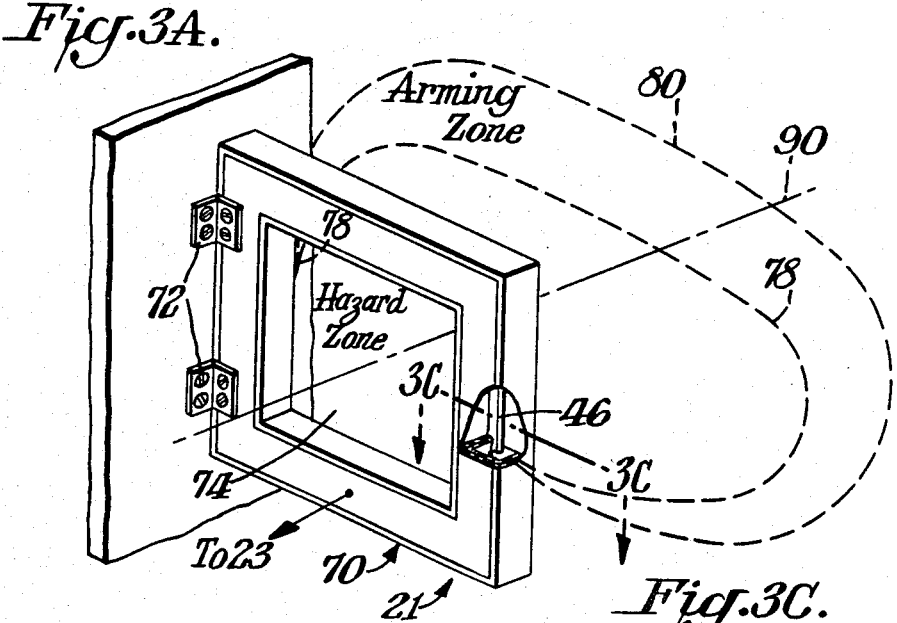
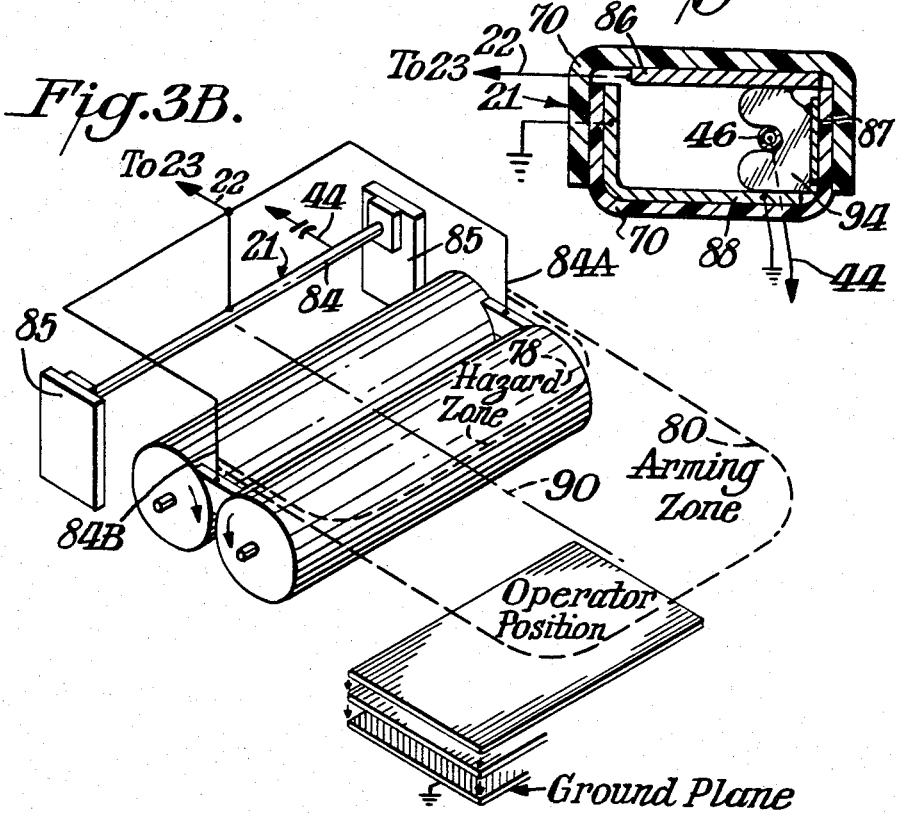

Fig. 10.

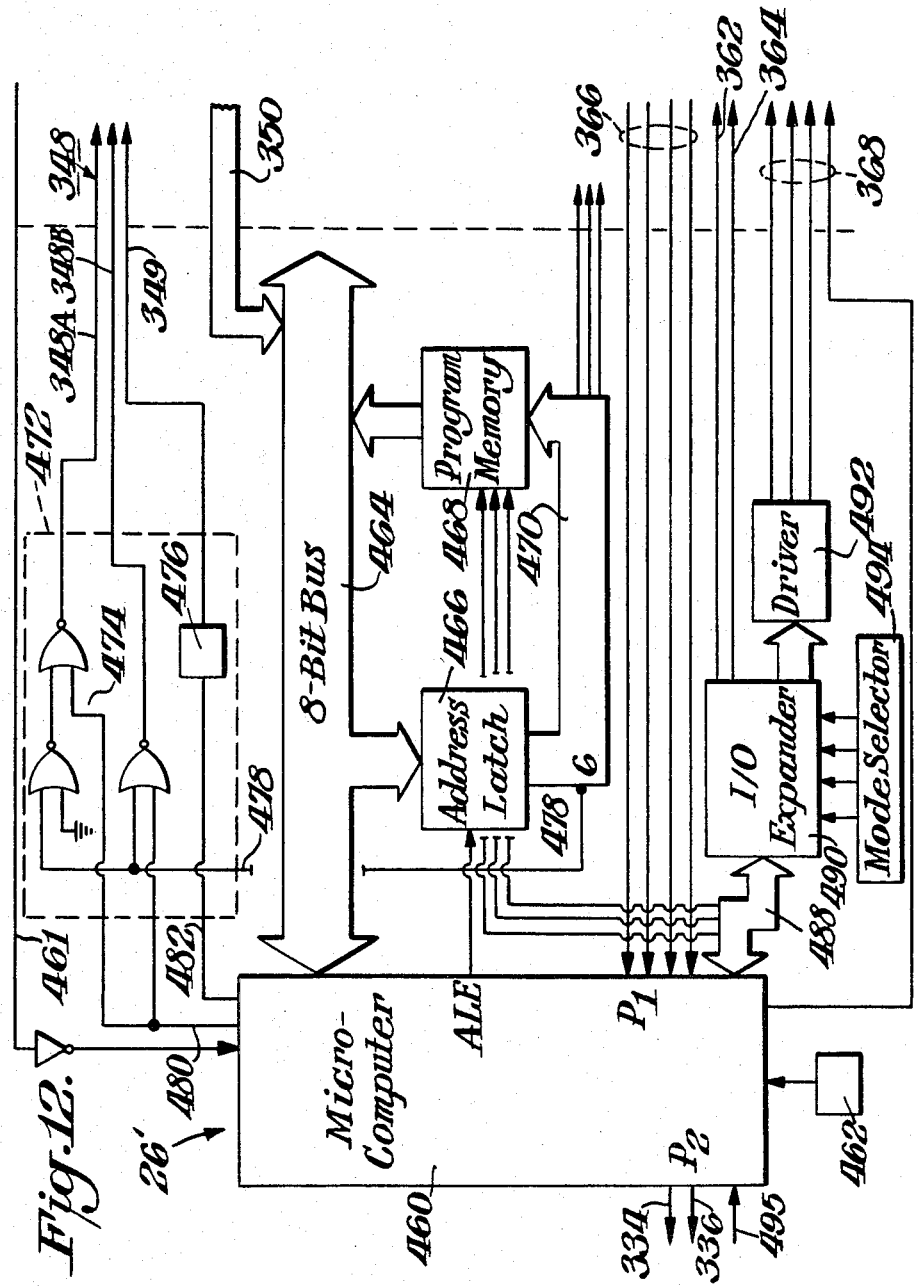

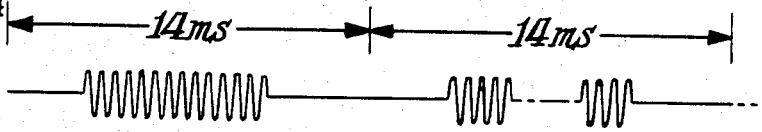
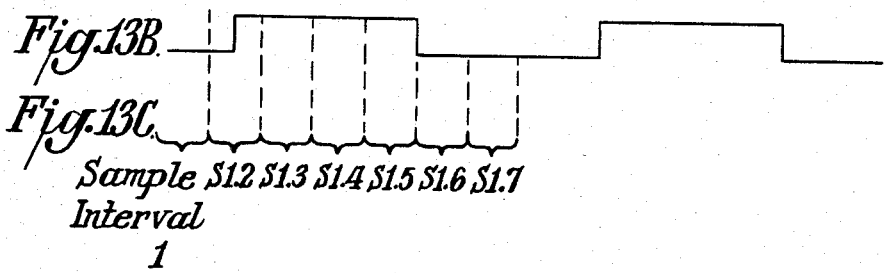
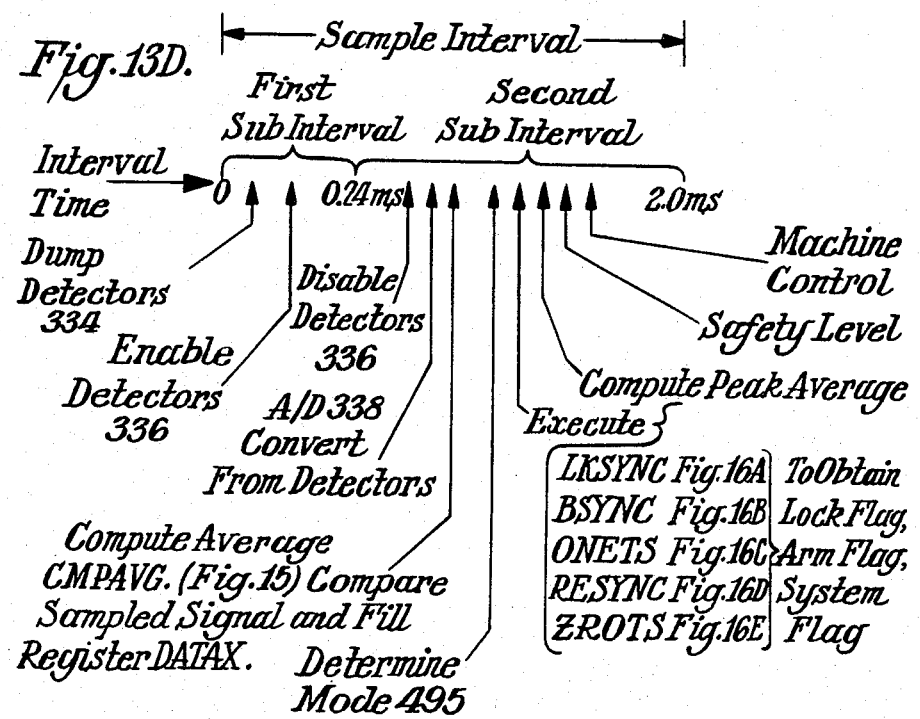

Fig. 13E.

| Sample Interval | DATAX Register MSB 6 5 4 3 2 1 LSB | SYNCX Register MSB 6 5 4 3 2 1 LSB | Sub Routine |
|---|---|---|---|
| 1 | – – – – – – – 0 | 0 0 0 0 0 0 0 0 | BSYNC |
| 2 | – – – – – – 0 0 | 0 0 0 0 0 0 0 0 | BSYNC |
| 3 | – – – – – 0 0 1 | 1 0 0 0 0 0 0 0 | BSYNC |
| 4 | – – – – 0 0 1 1 | 0 0 0 0 0 0 0 1 | { ONETS, RESYNC } |
| 5 | – – – 0 0 1 1 1 | 0 0 0 0 0 0 1 0 | BSYNC |
| 6 | – – 0 0 1 1 1 0 | 0 0 0 0 0 1 0 0 | BSYNC |
| 7 | – 0 0 1 1 1 0 0 | 0 0 0 0 1 0 0 0 | { ZROTS, BSYNC, RESYNC } |

— Indicates Don't Care

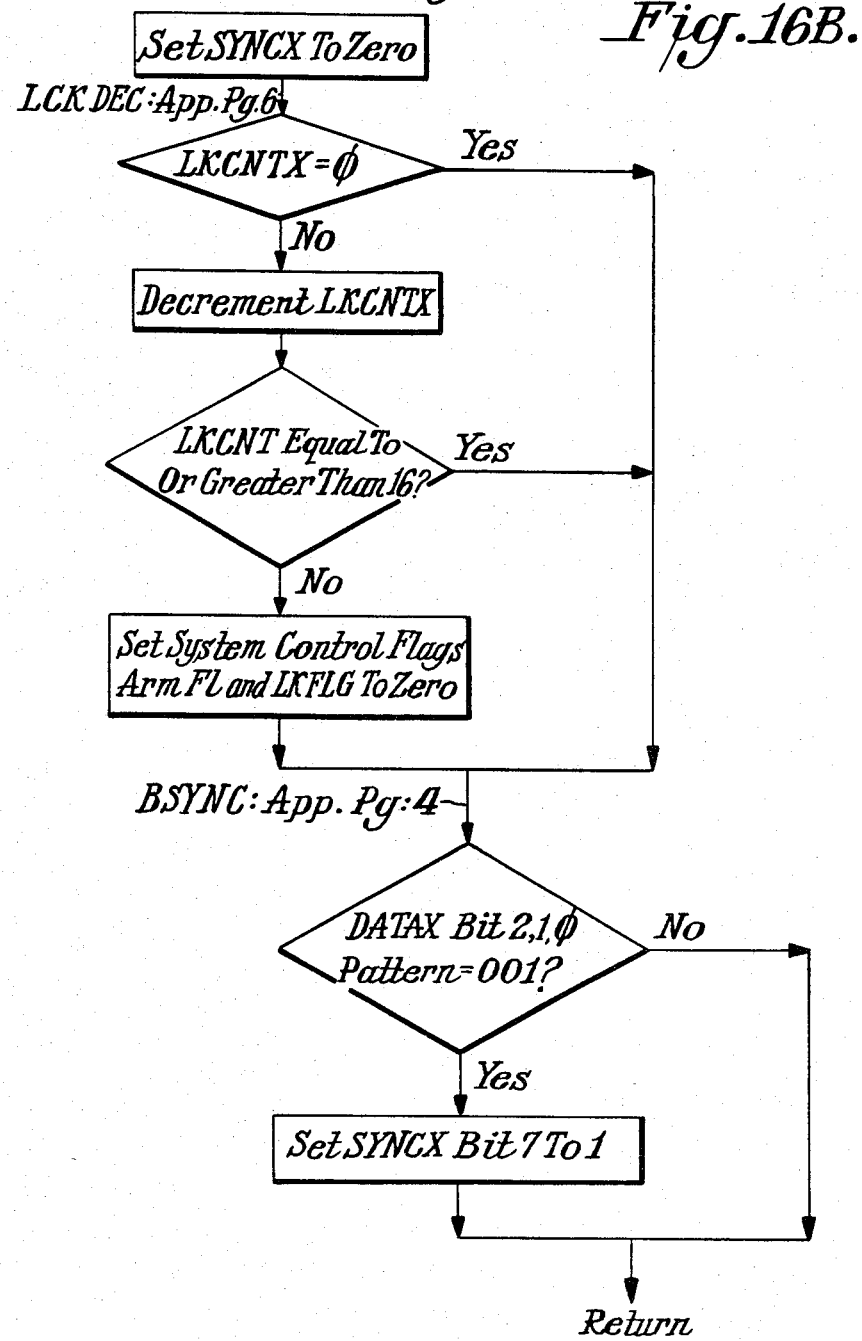

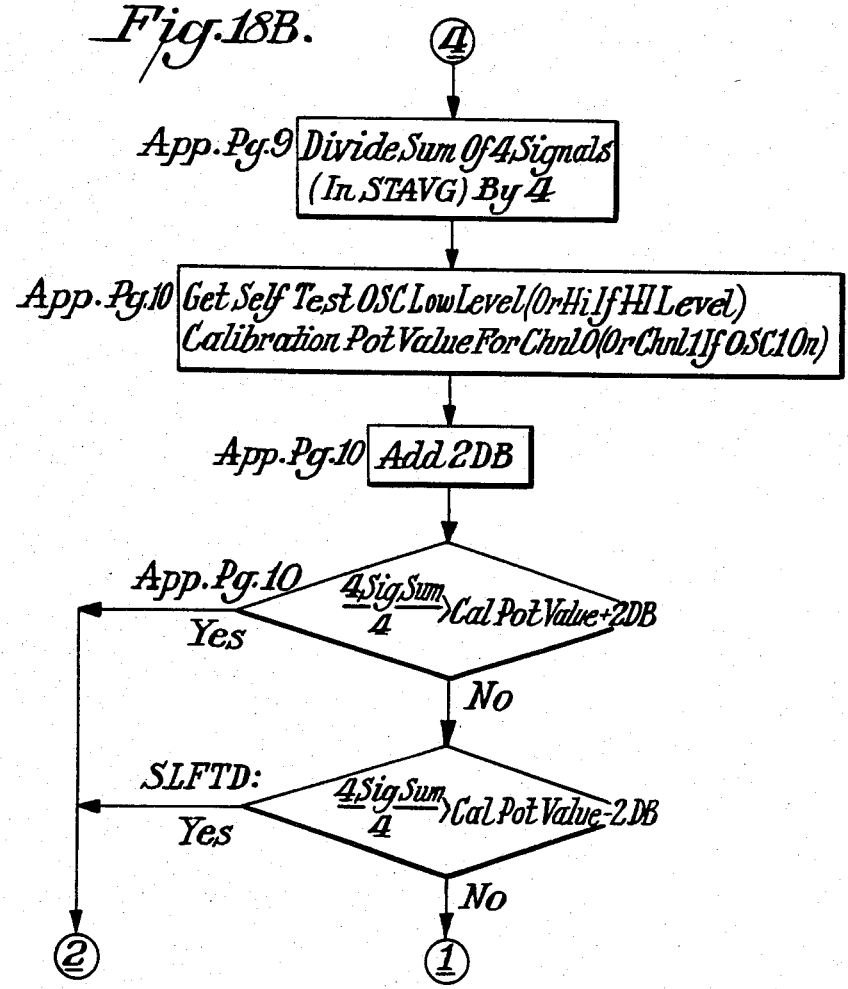

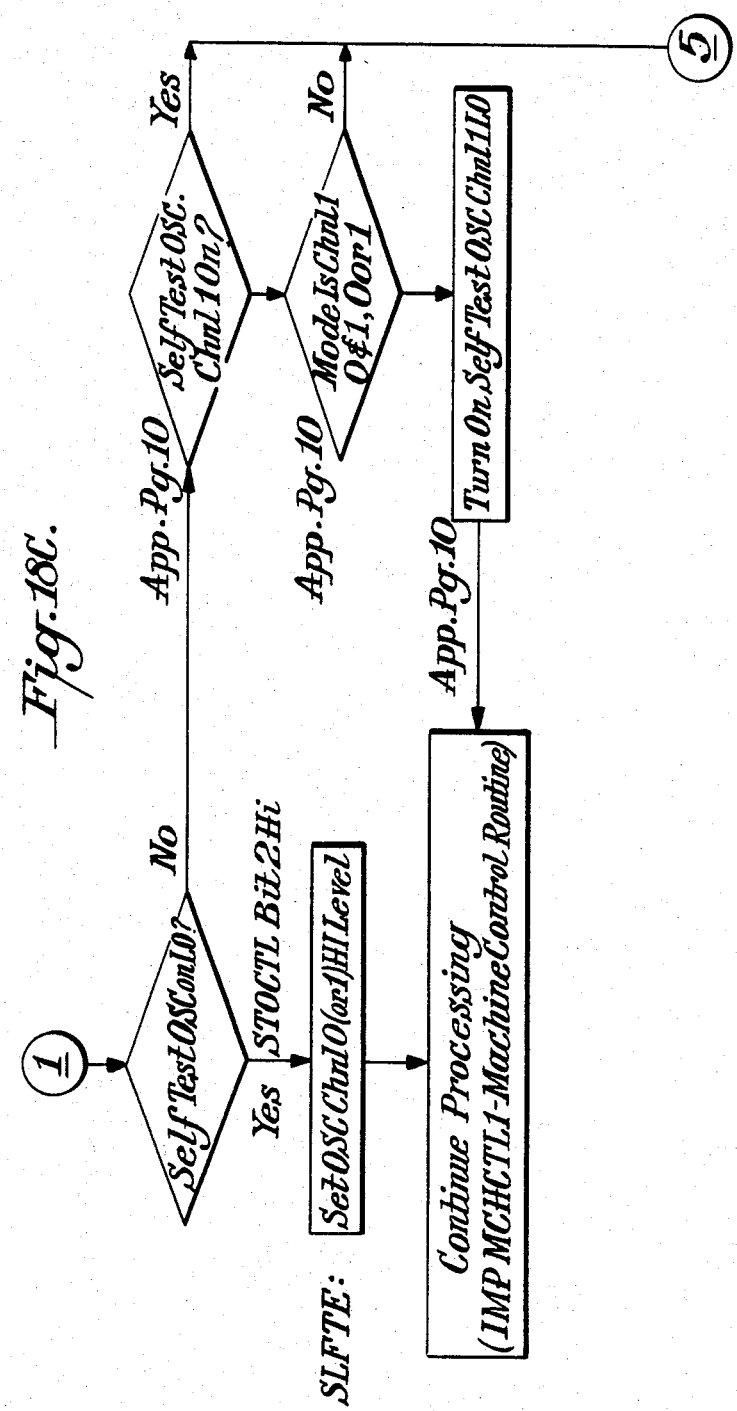

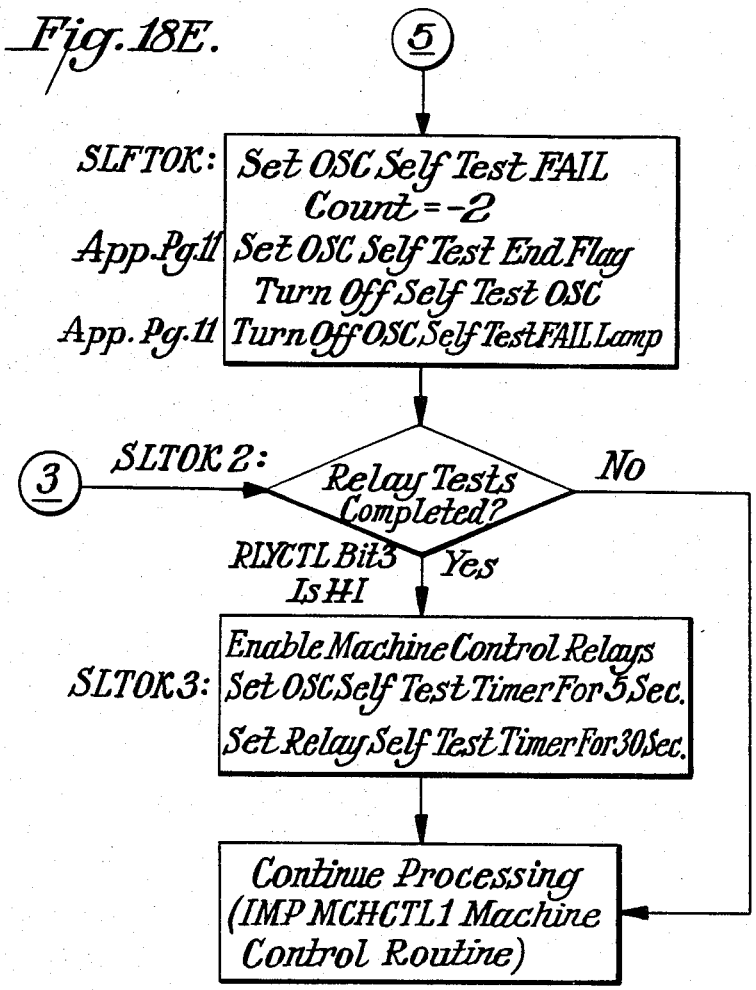

CAPACITIVELY COUPLED MACHINE TOOL SAFETY SYSTEM

CROSS REFERENCE TO RELATED APPLICATIONS

Subject matter disclosed herein is disclosed and claimed in the following applications filed contemporaneously herewith:

Capacitively Coupled Machine Tool Safety System Having A Self-Test Network, filed in the name of W. A. Cook et al. on Feb. 2, 1982, and accorded Ser. No. 345,191; and A Digital Quantizer, filed in the name of H. E. Betsill on Feb. 2, 1982 and accorded Ser. No. 345,192.

BACKGROUND OF THE INVENTION

1. Field of the Invention

This invention relates to a safety system for an operator of a machine tool and, in particular, to a safety system which utilizes a capacitively coupled transmission arrangement to provide a uniform pattern in a predetermined sensitivity zone around the machine tool.

2. Description of the Prior Art

Power driven machine tools constitute a primary cause of industrial accidents through crippling or severance of the hands or fingers of the machine tool operator. One attempted solution to this problem is the utilization of mechanical barriers to shield especially dangerous areas on the machine tool and prevent the introduction of any portion of the operator's anatomy into those areas of the tool while still allowing entry of the workpiece. For example, in the case of a pipe flanging tool, a barrier plate having an aperture sized to generally match the outside diameter of a tubular workpiece may be used to prevent the insertion of the operator's fingers or thumb into proximity with the jaws of the flanging machine. To be more fully certain that the operator's hands are protected, it is necessary that the aperture closely match the outside diameter of the workpiece. However, the aperture in the barrier plate must not be so restricted as to prevent the insertion of various sized or odd-shaped workpieces into the machine tool. But if the aperture is sized to receive a wide range of workpiece sizes, the possibility exists that a portion of the operator's body may become engaged by the jaws. It is difficult to find a barrier plate guard arrangement which is flexible enough to permit entry of a variety of workpiece sizes and shapes, yet which simultaneously affords protection to the operator and does not appreciably diminish the throughput of the machine tool.

Other mechanical expedients used in the art include the provision of barrier bars or touch bars which extend across the width of a machine tool. When struck by a portion of the operator's body these elements generate a signal which disables the machine tool. For example, in the case of the power rollers used to work rubber or elastomers, the operator stands on a platform facing two large counterrotating rollers which work the elastomeric material. Safety trip bars at knee level, elbow level and, perhaps even a head level trip wire, extend parallel to the axis of the rollers and interpose themselves between the body of the operator and the rollers. Thus if the operator becomes in any way snagged or drawn into the rotating machinery, the likelihood is that a portion of his body would engage against one of the trip members and would thereby disable the machine tool. However, it is possible that the restraints may be missed or, perhaps more likely, the restraints would terminate the operation of the machine tool only after injury has been inflicted upon the operator.

A number of radio controlled machine tool protection systems are available. Such systems include those described in the following U.S. Pat. Nos. 4,057,805 (Dowling, assigned to the assignee of the present invention); 3,983,483 (Pando); 3,950,755 (Westbrook, Sr.); 3,896,425 (Erichsen); 3,872,455 (Fuller et al.); 3,409,842 (Embling et al.); and 1,847,872 (Hand). Each of these devices utilizes some variant of an inductively coupled radio frequency transmitter-receiver arrangement. In such systems the sensitivity pattern of the receiving antenna is dependent upon the orientation of the transmitter on the person of the operator and is also subject to null spaces or voids in coverage. These systems detect and trip if material must be fed into the hazard zone surrounding the machine tool.

It is believed to be advantageous to provide a machine tool safety system which utilizes a capacitively coupled electric field generator (transmitter)-capacitive receptor antenna arrangement to eliminate the existence of null spaces and voids in the sensitivity coverage which exists with an inductively coupled transmitter-receiver arrangement. It is believed to be of further advantage to provide the electric field generator (transmitter) in a form able to be conveniently carried upon some portion of the person of the operator, e.g., the wrist. It is also believed advantageous to provide a safety system the sensitivity of which monotonically increases as the distance between the electric field generator (transmitter) and the capacitive receptor antenna mounted on the machine tool decreases.

SUMMARY OF THE INVENTION

The present invention relates to a machine tool safety system which includes an electric field generator, or transmitter, adapted to generate an electric field and a capacitive receptor antenna mountable to a machine tool, the capacitive receptor antenna and the generator cooperating to define a capacitively coupled transmission arrangement that overcomes the void and null problems associated with inductively coupled transmitter-antenna arrangements.

The electric field generator (transmitter) is adapted to be carried on some portion of the person of the operator, such as the wrist and is adapted to generate an electric, or potential field. The electric field generator includes a transmitting antenna the field of which can be shaped to overcome body shielding. The electric field generator uses the body of the operator upon whom it is carried as part of an electric field radiator.

The capacitive receptor antenna is mountable to the machine tool or in a predetermined location with respect to the machine tool and is cooperable with the electric field generator to form a capacitively coupled transmission arrangement able to induce, by the action of the electric field through the capacitive coupling, a monotonically increasing electrical signal, the magnitude of which is functionally related to the distance between the electric field generator and the capacitive receptor antenna The capacitive receptor antenna includes a conductive member configured in a predetermined manner to define a predetermined corresponding sensitivity zone which may generally be provided in a predetermined shape.

A signal processor is connected to the capacitive receptor antenna and is responsive to the signal induced in the antenna to generate a first, and/or a second indicator when the magnitude of the induced signal exceeds a first, and/or a second predetermined threshold, respectively. Any predetermined number of indicators may be generated. The indicators may be used to form the basis for decisions aimed at safe operation of the machine tool.

In the preferred embodiment of the invention the signal processor develops a representation of the magnitude of the electrical signal induced in the capacitive receptor antenna for comparison with the predetermined thresholds. It is also desirable in the preferred embodiment that the field produced by the electric field generator (transmitter) varies in accordance with a predetermined radio frequency carrier and is, in addition, modulated in accordance with a predetermined modulation characteristic. The field may exhibit a predetermined recurrence rate and duty cycle. The use of a carrier frequency permits selective high amplification of the induced signal and rejection of local changes in the electric field originating from extraneous sources. The modulation characteristic applied to the carrier frequency provides discrimination against the possibility of interference from other transmitters operating at the same carrier frequency (e.g., a local radio station). The signal processor also comprises a network for amplifying the carrier frequency and detecting the modulation characteristic of the induced signal to verify that the signal is induced in the capacitive receptor antenna by the action of the electric field from the electric field generator (transmitter).

BRIEF DESCRIPTION OF THE DRAWINGS

The invention will be more fully understood from the following detailed description thereof taken in connection with the accompanying drawings which form a part of this application and in which:

FIG. 2A is a detailed schematic diagram of an electric field generator (transmitter) used in the present invention; FIG. 2B indicates the waveforms of signals present at predetermined locations in FIG. 2A.

FIGS. 3A and 3B are, respectively, isolated perspective views of two specific configurations of a capacitive receptor antenna of the the present invention for use with a pipe flanging apparatus and an elastomer rolling apparatus, respectively, while FIG. 3C is a sectional view taken along section lines 3C—3C in FIG. 3A;

FIG. 4A is a schematic diagram of a receiver used in the embodiment of the safety system of the present invention having a discrete logic signal processor while

FIG. 7A is a schematic diagram of the self-test network used in connection with the embodiment of the present invention having a discrete logic signal processor, while

FIG. 10 is a schematic diagram of one stage of the I.F. amplifier and peak detector network used in the receiver of the embodiment of the present invention having a microcomputer controlled signal processor;

FIG. 12 is a block diagram of the microcomputer used to control the signal processor in the embodiment of the present invention shown in FIG. 8;

FIGS. 13A through 13E are timing diagrams and register sequence diagrams illustrating the operation of the microcomputer-controlled signal processor in the embodiment of the invention shown in FIG. 8;

FIGS. 14, 15, 16A–16D, and 17 are flow diagrams of the program used in connection with the microcomputer-controlled signal processor in the embodiment of shown in FIG. 8; and FIGS. 18A–18E are a flow diagram of the program used in connection with the self-testing of the microcomputer-controlled signal processor in the embodiment of the invention shown in FIG. 8.

DETAILED DESCRIPTION OF THE INVENTION

Figure 1:
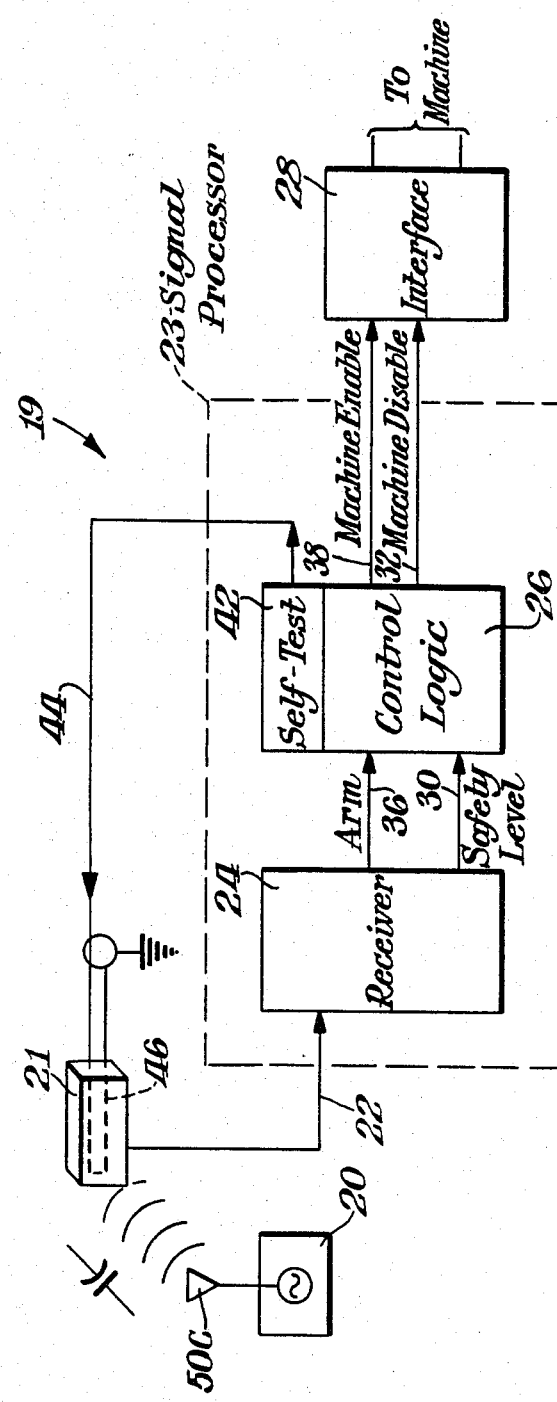
FIG. 1 is a generalized block diagram of the machine tool safety system using a capacitively coupled electric field generator-capacitive receptor antenna arrangement in accordance with the teachings of the present invention in which a discrete logic implementation of a signal processor is used.

Throughout the following detailed description similar reference numerals refer to similar elements in all figures of the drawings.

Figure 8:
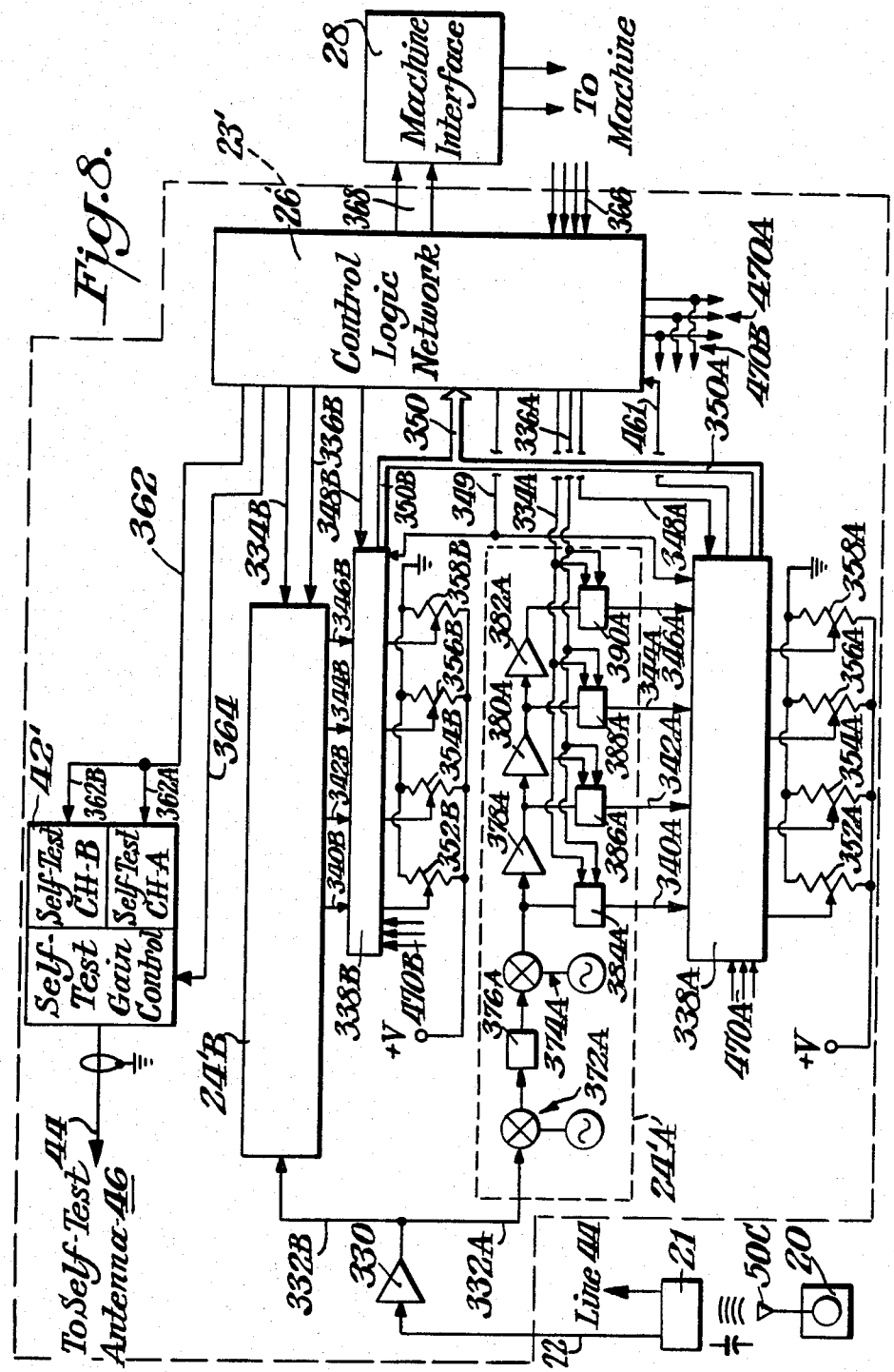
FIG. 8 is a generalized block diagram of a machine tool safety system using a capacitively coupled electric field generator-capacitive receptor antenna arrangement in accordance with the present invention in which a microcomputer controlled implementation of a signal processor is used.

FIG. 1 is a generalized functional block diagram of a machine tool safety system 19 in accordance with the present invention in which a discrete logic implementation of a signal processor is used. A generalized functional block diagram of the machine tool safety system 19, which utilizes a microcomputer controlled implementation of the signal processor (two channel receiver) is shown in FIG. 8. In the microcomputer-controlled signal processor embodiment generally similar functional units are indicated by primed reference numerals.

The machine tool safety system 19 includes an electric field generator, or transmitter, indicated by reference character 20, a capacitive receptor antenna 21 and a signal processor 23. The signal processor 23 itself includes a receiver 24, and a control logic network 26. The signal processor 23 is connected to a machine tool control interface 28 which interacts with the signal processor 23, the machine tool and the operator. The interface may include a power relay network which controls the application of electric power to the machine tool. The transmitter 20 and the capacitive receptor antenna 21 cooperate to define a capacitively coupled transmission system.

The electric field generator 20 is preferably adapted to be carried on a portion of the person of the machine tool operator, as for example the wrist. One or more electric field generators may be used to define multichannel operation (e.g., FIG. 8), each electric field generator being worn in a different location on the person of the operator depending upon the situation and the perceived safety risk. For example, when used with a pipe flanging apparatus where only one of the operator's hands is likely to be exposed to the risk of entry into a hazard zone, it may be sufficient to utilize a single wrist transmitter operating in one frequency channel. In an elastomer rolling mill where either arm may potentially enter a hazard zone, it may be desirable to utilize a dual frequency channel arrangement wherein a transmitter is provided on each wrist of the operator. Extension to Q frequency channels of operation and to R operators, of course, lies within the contemplation of the present invention. As is discussed herein, in the preferred embodiment of the invention the electric field produced by the electric field generator 20 is varied in accordance with a (i.e., as a function of) predetermined carrier frequency and is also modulated in accordance with (i.e., as a function of) a predetermined modulation characteristic.

The capacitive receptor antenna 21 is mountable in any predetermined location with respect to the machine tool. By the term "capacitive receptor antenna" it is meant a device which is sensitive to the electric field produced by the electric field generator 20 and responsive thereto to produce an electrical signal output, the "induced signal." The capacitive antenna 21 is a device adapted to capacitively couple a conductor (antenna) disposed as part of the electric field generator 20 with a conductive member provided within the capacitive receptor antenna 21. The capacitive receptor antenna 21 is configured to exhibit a predetermined sensitivity pattern that covers a predetermined hazard zone about the machine tool, as discussed in connection with the specific examples shown in FIG. 3. The capacitive receptor antenna 21 responds to the electric field generated by the electric field generator 20 by producing an induced signal on an output line 22 that monotonically increases as the distance between the electric field generator 20 and the capacitive antenna 21 decreases. In this manner the voids and nulls associated with electromagnetic and magnetic coupling techniques used in various prior art safety devices are eliminated. Judicious selection of the configuration of the conductive member in view of the machine tool's configuration and with appropriate conductive shielding provides the capability of forming unique sensitivity patterns which may be desirable when protecting various machine tools.

The signal processor 23 is connected to the capacitive receptor antenna 21 and responds to the induced signal on the line 22 to generate one or any predetermined number of indications or indicators which may be used to form the basis of decisions aimed at the safe operation of the machine tool. The indicators are generated by comparison of the magnitude of the induced signal with each of an appropriate predetermined number of thresholds.

The signal processor 23 may be implemented in a discrete logic implementation as, for example, is shown in FIGS. 1 through 7, or in a microcomputer controlled implementation as, for example, is shown in FIGS. 8 through 18. Each implementation of the signal processor 23 includes a receiver 24 and a control logic network 26.

In the discrete logic implementation, the receiver 24 is connected to the capacitive antenna 22 and is responsive to the received induced signal to generate a first electrical signal (SAFETY LEVEL), and a second electrical signal (ARM). The receiver 24 is preferably configured to impart a predetermined functional relationship between the magnitude of the first and second signals and the distance between the electric field generator 20 and the capacitive receptor antenna 21. Preferably, the receiver 24 is configured to respond in a more sensitive fashion to changes in the magnitude of the first signal (SAFETY LEVEL) when the electric field generator 20 is at distances closer to the capacitive receptor antenna 21. This provides for greater sensitivity as the electric field generator 20 (i.e., the portion of the operator's anatomy carrying the electric field generator 20) comes closer to the hazard zone. In addition, the receiver 24 is configured to respond with greater sensitivity to variations in the magnitude of the second signal (ARM) as the electric field generator 20 is farther away from the capacitive receptor antenna 21. An exponential form of the relationship is illustrated graphically in FIG. 4B. Of course, the receiver 24 may be configured to impart any desired predetermined functional relationship.

The first electrical signal, the SAFETY LEVEL signal, is applied over a line 30 to the control logic 26. When the magnitude of the first electrical signal on the line 30 exceeds a predetermined threshold (representative of the entry in the hazard zone of the portion of the person of the operator carrying the transmitter) a first indicator, a MACHINE DISABLE signal, is applied on a line 32 to the machine tool interface 28. The machine tool is therefore disabled to avert the possibility of injury to the operator. The second signal (ARM) is output on a line 36 from the receiver 24 to the control logic 26. The control logic 26 contains circuitry adapted to compare the magnitude of the signal on the line 36 with a predetermined threshold. If the signal on the line 36 exceeds the threshold (representative of the fact that the operator has entered a predetermined arming zone with an operative transmitter) a second indicator, MACHINE ENABLE signal, is applied on the line 38 to the machine interface 28.

In the preferred embodiment of the invention the field generated by the electric field generator 20 is varied in accordance with a predetermined carrier frequency and the carrier is modulated in accordance with a predetermined modulation characteristic so as to exhibit a predetermined recurrence rate and duty cycle. Accordingly both the SAFETY LEVEL and the ARM signals will vary at a frequency which corresponds to the carrier frequency and in a manner which corresponds to the modulation characteristic. The signal processor 23 contains circuitry which amplifies the induced signal and detects the modulation characteristic of the first and/or the second signal and compares the detected modulation characteristic with a modulation characteristic reference. A true comparison is indicative of the fact that the induced signal from the capacitive antenna 21 is produced as a result of the transmission from the electric field generator 20 and its antenna 50C. Such a true comparison may be made a necessary condition before the machine tool is enabled and/or disabled. The presence of a true comparison is preferable as a necessary condition for the generation of the MACHINE ENABLE signal which is required for operation of the machine tool. If more than one transmitter is used, each transmitter operates at a different carrier frequency. A separate receiver channel (which may be connected to the same or to a different capacitive antenna) and a separate processor channel are used for each transmitter carrier frequency.

In the microcomputer controlled implementation of the signal processor 23' shown in FIGS. 8 through 18, each channel of the receiver 24' responds to the induced signal to translate it to an IF frequency, develops four successive estimations of the induced signal level, and peak detects in a sample-and-hold manner under the control of a microcomputer 460 (FIGS. 8 and 12) in the control logic 26'. The four successive estimations are applied to an analog-to-digital converter and read by the microcomputer to generate one binary numerical representation in log format of the induced signal at the sample time. Thresholds are established by potentiometers 352, 354, 356 and 358 (FIG. 8) which can be accessed by the microcomputer and used to develop the indicators herein discussed. When the electric field is varied in accordance with the radio frequency carrier and modulated in accordance with the predetermined modulation characteristic, an exponentially averaged representation of the signal is developed by computer algorithm. The virtue of the microcomputer control permits ease of adaption of the signal processor 23' to generate indicators needed to meet the safety requirements of a specific machine tool. A listing of the program for the microcomputer is provided in the Appendix attached hereto and hereby made part of this application.

The safety system 19 includes several precautionary features. First, the safety system 19 includes a self-test generator 42 adapted to apply self-testing signals over a line 44 to a self-test antenna 46 disposed in a predetermined location to the capacitive receptor antenna 21. If a self-test function is used, the satisfactory passing of a sequence of self-testing operations may be imposed as a further condition to the generation of an indicator.

As a second precaution the electric field generator 20 may be provided with a network which monitors its operation to insure a stable output signal level. One manner in which this may be accomplished is to measure the battery voltage of the electric field generator, and should the supply voltage be found to be too low, a network is operative to immediately discharge the supply rather than allow the supply to degrade slowly with further use. Alternatively, if the supply falls below a predetermined threshold, the carrier is no longer modulated at the predetermined recurrence rate, thus causing the received signal to be rejected.

ELECTRIC FIELD GENERATOR

Figure 2C:
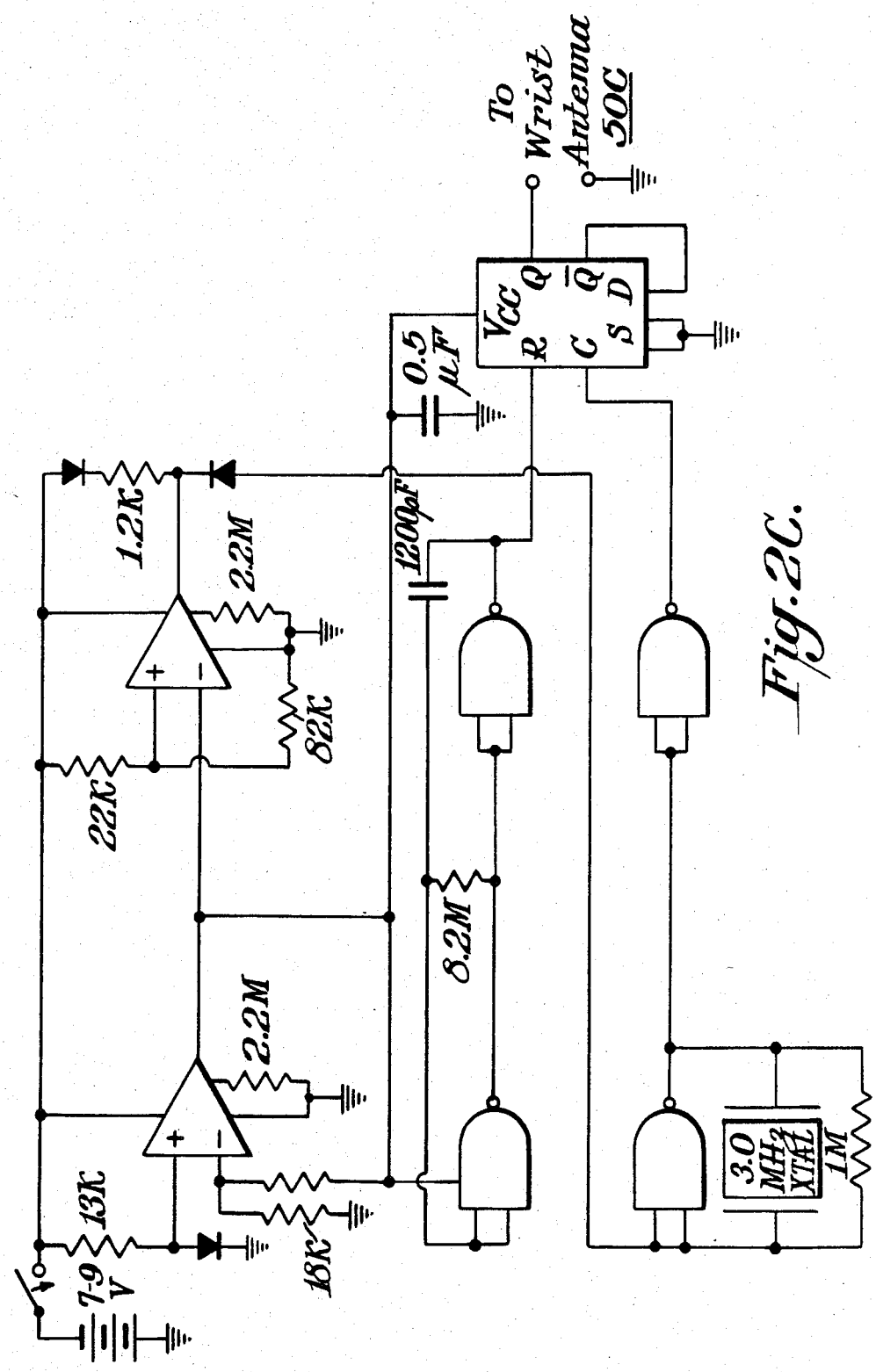
FIG. 2C is a schematic diagram of an electric field generator useful in connection with a discrete logic implementation of a signal processor.

FIG. 2A is a detailed schematic diagram of the electric field generator 20 used in connection with the microcomputer controlled signal processor. FIG. 2C is a schematic diagram of an electric field generator which may be used in connection with the discrete logic implementation of the signal processor.

The electric field generator 20 is a battery operated crystal controlled device preferably sized to be mounted within a conductive, metallic casing 50 fabricated from e.g., stainless steel or aluminum. The casing 50 is about the size of a wrist watch. The watch size is believed most convenient for carrying by a machine operator on the wrist. Of course the electric field generator 20 may be modified for carrying about any predetermined portion of the anatomy of the operator.

The crystal controlled oscillator contained within the electric field generator 20 must be referenced to ground on one terminal in order to establish the electrical field produced thereby. Accordingly, a capacitive or ohmic contact between a portion of the casing and the body of the person is required. The cover and metal band 50C of the casing 50 is insulated from the bottom 50B by a layer of insulating material 50L. The bottom 50B of the casing 50 is in contact with the skin of the operator. The band is suspended above the skin of the operator by an insulating pad 50P such that a potential field is established between the skin of the operator and the band. This provides nearly isotropic coverage with minimum shielding effects.

Alternatively, the electric field generator 20 may comprise two concentric bands separated by an insulator such that both bands are driven in opposition. The entire assembly is suitably insulated on all surfaces to prevent body contact with the operator and to protect the electric field generator from the environment.

In some instances, as in the elastomer rolling environment shown in FIG. 3B, it may also be desirable that the operator occupy a position on a ground plane so that the body of the operator is capacitively coupled to ground to further stabilize the strength of the field produced by the electric field generator 20. It should be noted that in those instances where the operator is manipulating large metallic workpieces, as in conjunction with a pipe flanging machine, the radiated field from the electric field generator 20 increases when the metallic workpiece is grasped before the workpiece contacts the machine. Since this occurrence has a tendency to increase the induced signal, it is viewed as a substantially failsafe condition.

Each battery powered electric field generator is preferably configured to emit a unique modulated signal at a frequency sufficiently low to provide essentially isotropic coverage of the hazard zone and the arming zone (FIG. 3) of the capacitive receptor antenna. If a second electric field generator is utilized, the second transmitter emits a second similarly modulated signal at a different carrier frequency spaced from the first carrier frequency to a duplicate second receiver which may be connected to the same or a different capacitive receptor antenna. The signal from the second transmitter may be modulated at the same or a different modulation characteristic.

In view of the fact that the signal processor 23 defines basically an amplitude sensing and discrimination system, any degradation of either the receiver system gain or electric field generator power will cause the hazard zone limit to move closer to the machine tool. To prevent such a condition from arising without warning, the periodically operating calibrated self-test generator system 42 operates through the self-test antenna 46 to insure that the receiver gain does not degrade. The self-test system is discussed herein in connection with FIGS. 7 and 11. At the same time, degradation of the strength of the electric field is prevented by means of a continuously operating circuit monitor which effectively drains the power source, typically a battery, to prevent partial recovery of the battery during periods of disuse or which disables the modulator to permit transmission of only an unmodulated carrier, which condition would result in rejection of the signal by the signal processor.

With reference to FIG. 2A, the detailed schematic diagram of the electric field generator 20 used in the operator safety system of the present invention having the microcomputer controlled implementation of the signal processor is shown. The transmitter 20 is operated by a single cell mercury battery 54 of the hearing aid type. The battery 54 is preferably that manufactured and sold by Everready Inc. under model number EP6-75E6. The transmitter is operated upon closure of a switch 56 by the machine operator. The switch 56 is conveniently mounted on a suitable location in the casing 50. The expected lifetime of the battery 54 is approximately one hundred hours at which time the voltage output drops from the nominal fresh value of 1.35 V to 1.2 V.

As seen in FIG. 2A the electric field generator 20 includes a radio frequency oscillator network 58, a radio frequency amplifier modulator network 60, an output parallel resonant network 62 (69,70), a modulating network 64 and a battery monitor network 68. The radio frequency oscillations are generated by the transistor 58A in combination with a crystal 66 and associated components. Suitable for use as the transistors 58A and 60A are devices manufactured by Motorola and sold under model number 2N2222A.

The output coil 69 and shunt capacitor 70 steps up the output voltage. In practice, about six volts peak-to-peak is available at the output. The radio frequency carrier preferably lies in the range from 1.5 to 1.9 MHz. This signal is present at the test point TP-1 as illustrated in FIG. 2B. Depending upon the carrier frequency, the magnitude of the capacitor 70 is either 300 pF. (for 1.5 to 1.7 MHz operation) or 220 pF. (for 1.7 to 1.9 MHz operation).

The RF carrier is switched on and off by the modulating network 64. An operational amplifier 64A such as that sold by National Semiconductor under model number LM10 is used to produce a square wave voltage reference. The recurrence rate is about seventy Hertz, although any predetermined recurrence rate may be used. Proper setting for the modulator 64 is established by a potentiometer 64R which is adjustable to provide a square wave signal of a predetermined duty cycle (preferably fifty percent) to the amplifier 60. Of course, any suitable duty cycle may be employed. This waveform, derived from test point TP-2, is illustrated in FIG. 2B. The carrier signal, modulated in accordance with the modulation characteristic imparted by the modulator 64, produces an output waveform radiated from the antenna 50C of the form shown in FIG. 2B.

Monitoring of the battery voltage is accomplished by a battery monitor network 68 preferably formed of an operational amplifier 68A such as that sold by National Semiconductor under model number LM10. The amplifier 68A contains an accurate internal voltage reference (pin 1) and a general purpose amplifying stage (pins 2, 3 and 6). The output reference (pin 1) is compared with the battery voltage applied at pin 3 through a potentiometer 68R. The potentiometer 68R is adjusted for modulation cutoff upon the battery voltage dropping below 1.2 V. When the battery voltage falls below this level (1.2 V) the output (pin 6) of the amplifying stage switches states to cut off the modulator 64. Thus, the electric field generator outputs a continuous unmodulated RF carrier signal (as shown at TP-1 in FIG. 2B). As will be discussed herein the signal processor 26 is arranged to reject a continuous (unmodulated) RF carrier signal and an indicator signal is unable to be generated. In addition, continuous transmission of the unmodulated RF carrier signal increases the drain on the battery. This occurrence is advantageous in that it minimizes the possibility of short term battery recovery by temporarily turning off the generator.

As an alternative, a crowbar network may be used to monitor the battery voltage. As long as the battery supply remains greater than a reference voltage applied to an operational amplifier in the crowbar network the output of the amplifier is not asserted. However, as soon as the battery supply drops below the reference, the amplifier changes state to close a switch which effectively shunts the battery to ground potential.

The rf voltage applied to the cover and conductive band relative to the body of the operator generates an essentially isotropic electric field. This is due to the fact that the near field conditions of electromagnetism apply. The electric field lines terminate uniformly at the surface of the conductive member disposed in the capacitive receptor antenna regardless of the orientation of the electric field generator. Consequently, the generation of nulls, voids or dead spaces in the sensitivity pattern of the capacitive receptor antenna 21 is avoided. It may be desirable to include in the generator a network to monitor the electric field strength to insure that the field's strength remains above a predetermined level.

It should be noted that when several electric field generators are operating simultaneously each transmits on a different crystal frequency. Therefore, an arming indicator may be generated for each generator used in the particular safety system. Of course, should the circuitry which generates an arming indicator not be utilized in a particular application the modulation of the field is superfluous. It is desirable that the field be varied at a sufficiently low carrier frequency such that the entire safety system may operate in the near field and that the capacitive coupling action between the field generator and the capacitive receptor antenna be almost entirely the result of capacitive coupling between the electric field generator and the capacitive receptor antenna.

Modifications to the electric field generator shown in FIG. 2A may be necessary to permit use of that circuit with the discrete logic implementation of the signal processor. For example, it is necesssary to provide a higher voltage source (e.g., nine volts) and to eliminate off period residual leakage current. Alternatively, the circuit shown in FIG. 2C may be used.

THE CAPACITIVE RECEPTOR ANTENNA

FIGS. 3A and 3B are isolated perspective views of two of the possible configurations of a capacitive receptor antenna used in connection with the operator safety system of the present invention.

The capacitive receptor antenna shown in FIG. 3A is adapted for use with a safety system arranged for the protection of an operator's hand while using a pipe flanging tool. The capacitive receptor antenna shown in FIG. 3B is adapted for use in connection with an elastomeric roll mill. Of course, the capacitive receptor antenna 21 may be arranged in any suitable configuration compatible with the environment in which the safety system 19 is used.

As seen in FIG. 3A the capacitive receptor antenna 21 is disposed within a substantially rectangular, nonconductive frame 70 that is conveniently mounted, as by pivots or hinges 72, adjacent to the face of a power tool. For example, the frame 70 is preferably pivotally mountable to the tool itself such that the machine tool forms part of the shielding structure. An aperture 74 is defined through which elongated objects may be inserted into the jaws of the tool. No portion of the machine tool should protrude through the aperture. The capacitive receptor antenna 21 has a sensitivity which defines a hazard zone extending a predetermined close distance about the region forward of the frame 70. The boundary of the hazard zone is indicated by the dashed lines 78 in FIG. 3A. Entry of the portion of the person of the operator having the transmitter 20 (FIG. 2) thereon into the hazard zone 78 causes the SAFETY LEVEL signal (on the line 30) to exceed the threshold and results in the generation of the first indicator signal. If desired, any predetermined number of zones may be defined.

Further removed from the hazard zone is a similarly shaped arming zone defined about the capacitive receptor antenna 21 by the dashed lines 80. Entry of the operator having the transmitter 20 thereon into the arming zone 80 results in the generation of the ARM signal on the line 36 which, if it exceeds the threshold level, generates the second indicator. The distances of the outer boundaries of the zones 78 and 80 are controlled by the threshold settings in the signal processor. FIG. 3C is a side elevational view taken along section lines 3C—3C in FIG. 3A illustrating the structure of the capacitive receptor antenna 21. The capacitive receptor antenna 21 is formed of a conductive member 86 electrically connected to a second conductive member 87. The members 86 and 87 are formed of copper tape. A substantially L-shaped aluminum electrostatic ground shield 88 is provided behind the conductive member 86 plate. The shield 88 enhances sensitivity along the axis 90 of the antenna and minimizes the effects of electrical noise originating from points behind the shield 88. The members 86, 87 and the ground shield 88 are disposed in a suitable nonconductive casing 70 such as vacuum-formed (extruded nonconductive) ABPS plastic to provide mechanical protection. The self-test antenna 46 is an insulated wire loop supported in its position between the conductive members 86 and 87 and the electrostatic shield 88. The self-test antenna 46 is supported by a thermoplastic holder 94.

In the environment of a rubber rolling mill the capacitive receptor antenna 21 (FIG. 3B) takes the form of an elongated conductive tubular member 84 mounted between end plates 85. The tubular member 84 extends substantially parallel to the axis of the rolls at a location just above the top and just past the roll farthest from the operator. In practice it may be necessary to utilize compensating supplementary stub antennas 84A and 84B disposed forwardly above the ends of the tubular member 84. The stub antennas are electrically connected to the tubular member. Again a hazard zone 78 is defined a predetermined distance forward of the capacitive receptor antenna and an arming zone 80 further removed therefrom. It should be noted that although the details of the machine tool are not shown in FIG. 3B, the structure of the machine tool is needed to produce the patterns as shown in that Figure.

SIGNAL PROCESSOR

The signal processor 23 comprises the receiver 24 and the control logic 26. In the manner set forth herein the discrete logic implementation of the signal processor 23 is responsive to the magnitude of the induced signal to generate indicators when the induced signal magnitude exceeds predetermined thresholds. As exemplified herein, the indicators form the basis of decisions aimed at the safe operation of the machine tool.

System operation is based upon the ability of the receiver 24 to selectively receive, identify (if the field is modulated) and amplitude detect the induced signal over a wide dynamic range. The receiver 24 may be a dual-conversion multi-channel type for providing video level output signals which are nonlinear functions (typically logarithmic) of the radio frequency input signal level. The receiver is operative to generate a signal (SAFETY LEVEL) that exhibits a first functional relationship to the distance between the electric field generator 20 and the capacitive receptor antenna 21 and a second signal (ARM) which exhibits a second functional relationship with the distance between the electric field generator 20 and the capacitive receptor antenna 21. The convert-up and convert-down configuration of the receiver 24 (which is described in connection with FIG. 4A) not only facilitates setting different frequencies into the receiver and provides high image frequency rejection, but it also enables the receiver to respond with higher sensitivity to the weak signals for establishing arming distance while simultaneously responding with greater sensitivity to the close range signals for enhanced reliability in handling the signal levels within the hazard zone. Tuning the receiver to a predetermined frequency is simply accomplished by changing the first local oscillator crystal frequency and realigning the corresponding radio frequency filter.

Figure 4A:
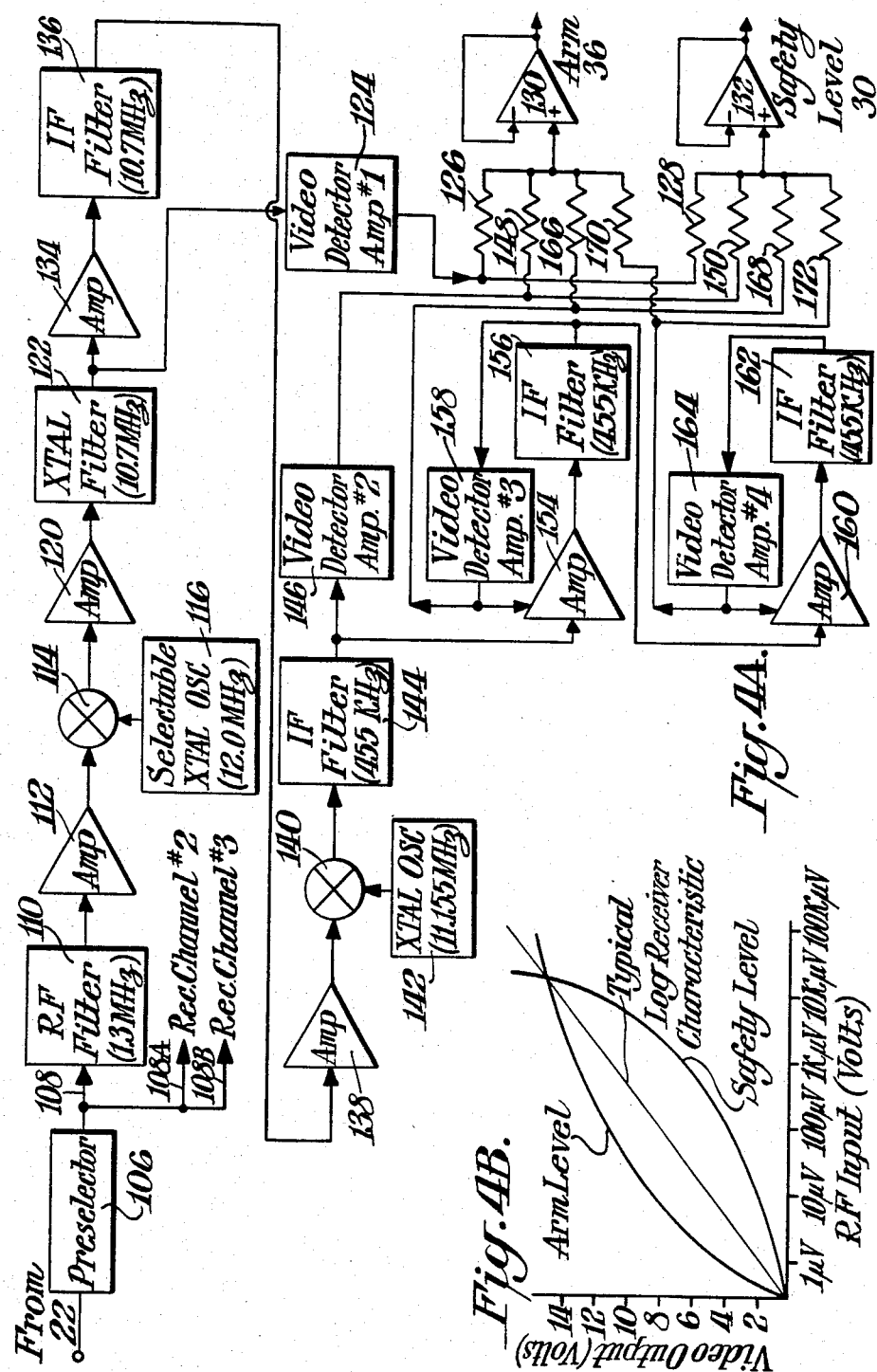

Referring to FIG. 4A, shown is a block diagram of the general configuration of a single channel of the receiver 24 used in one embodiment of the invention. The front end comprises a tuned preselector 106 which impedance matches the capacitive receptor antenna 21 via a transmission line 22 to all installed receiver channels, such as the two additional channels depicted by leads 108A and 108B, wherein the number of channels installed matches the number of electric field generators 20 in use. Filter 110 provides a bandpass of around one hundred kHz upon a 1.3 MHz center frequency and passes the received signal, after amplification by a first amplifier 112, to a first mixer 114, typically a MCLSCA-1 sold by MiniCircuits, a division of Scientific Components Corporation, where it is mixed with a twelve MHz signal from a selectable, crystal-controlled oscillator 116. The mixer 114 is "high side" injected with the signal from the oscillator 116 which has a frequency selected to equal the sum of the 10.7 MHz first IF frequency with the RF antenna frequency generated by the particular electric field generator 20, in this case, 1.3 MHz.

The output of mixer 114 is further amplified by a second amplifier 120 and passes through bandpass-filter 122 having a characteristic passband of eight kHz and centered at 10.7 MHz. The SAFETY LEVEL and ARM signals are generated by superimposing a predetermined number of currents representing the induced signal from the capacitive receptor antenna 21. A first video detector amplifier 124, connected to the output of filter 122, generates a first detected signal current through resistors 126 and 128 for input to ARM and SAFETY LEVEL buffers 130, 132, respectively.

The second detected signal current is derived in the following manner: An amplifier 134 amplifies the output signal from the filter 122 and passes it to a 10.7 MHz IF filter 136 having a passband of eight kHz for additional receiver selectivity bandpass narrowing. An amplifier 138 further amplifies the output signal of the filter 136 and applies it to one input terminal of a second mixer circuit 140 similar to the mixer 114 while a crystal oscillator 142 generates an 11.125 MHz signal for input to the other input terminal of the mixer 140. The resultant mixer output signal is filtered by a 455 kHz IF filter 144 (having a passband of fifteen to twenty-five kHz) before it is detected by a second video detector amplifier 146 which in turn generates a second detected signal current through resistors 148 and 150, respectively.

Figure 4B:
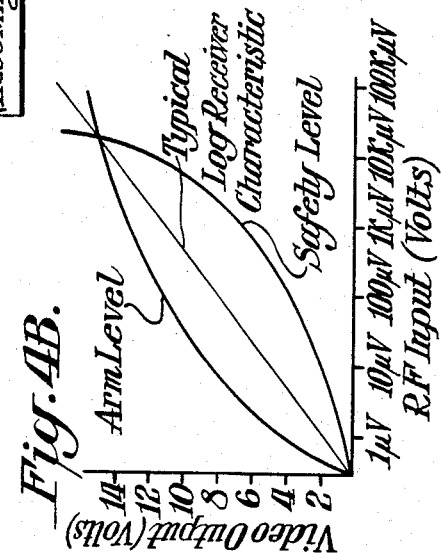
FIG. 4B is a graphic depiction of the functional relationship between the input signal to the receiver and the output from the receiver.

In a similar fashion, the third and fourth detected signal currents are derived from amplifier-filter-video detector loops 154, 156 and 158 and 160, 162, 164, respectively to generate detected signal currents through respective resistors 166, 168 and 170, 172. Each of the filters 156 and 162 have a passband of fifteen to twenty-five kHz and a center frequency of 455 kHz. The values of the resistors 128, 150, 168 and 172 are selected to cause the first electrical signal (SAFETY LEVEL) to follow the lower curve in FIG. 4B. The values of resistors 126, 148, 166, 170 are selected to tailor the second signal (ARM) to follow the upper curve in FIG. 4B. The resistors have values which range typically from 50K ohms to 1M ohms. By way of example, the straight line in FIG. 4B represents the logarithmic condition where all resistors have identical values, in this case 820K ohms. It also becomes evident that the response curves can assume any shape to cover a specified machine safety requirement. In the instant example, the ARM signal output from the buffer 130 has the steepest characteristic response when signal strength is weakest. This would correspond to the induced signal from the capacitive receptor antenna 21 when the operator is just entering the arming zone 80 (FIGS. 3A and 3B). On the other hand, the SAFETY LEVEL curve has the steepest slope when the electric field generator 20 is closest to the capacitive receptor antenna 22. This would occur when the operator is nearest to the hazard zone 78 (FIGS. 3A and 3B). Since the receiver 24 is made to be position-sensitive to the high level transmitter signals close to the protected machine the limit of the hazard zone 78 remains essentially fixed in space. Deviations from the predetermined performance standards are detected by means of the self-test system discussed herein.

The control logic 26 functions to generate the MACHINE ENABLE and MACHINE DISABLE indicators. These indicators are based on the magnitude of the amplitudes of the SAFETY LEVEL and ARM signals, and the identification of the modulation characteristics of one of these signals. In addition the results of the self-test system may also be used to form these signals. These signals are used to assert overriding control over the machine operator's freedom to energize the machine or to work in the vicinity of its hazard zone.

Figure 5:
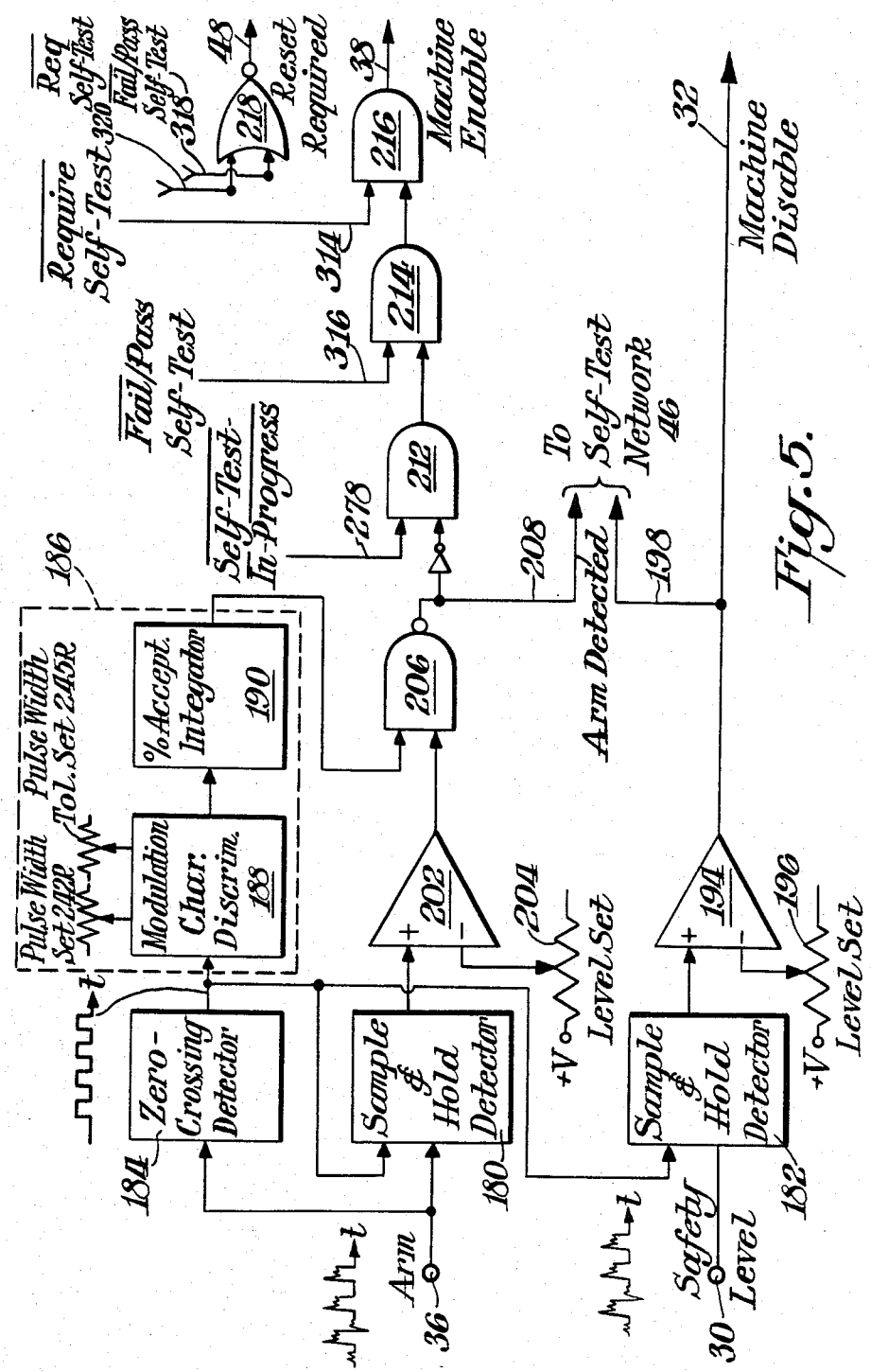
FIG. 5 is a schematic diagram of a discrete logic implementation of a control logic network used in connection with the embodiment of the present invention having a discrete logic signal processor.

FIG. 5 shows in schematic diagram form the basic features of the control logic circuitry comprising both digital and analog components used in the embodiment of the invention in which the signal processor is implemented in discrete logic form. The ARM and SAFETY LEVEL square wave signals shown on the lines 36 and 30, respectively, are typical of signals formed by the receiver 24. These pulse signals, which have amplitudes that vary above a zero-volt base line, are functions of signal strength and are input to sample-and-hold circuits 180 and 182, respectively.

A zero-crossing detector 184 monitors the ARM signal waveform and then applies its squared-up output signal to the control terminals of both detectors 180 and 182 in order to synchronize their sample-and-hold functions with the occurrence of each pulse in the ARM signal waveform. The output signal of zero-crossing detector 184 is a constant amplitude pulse train wherein each pulse has a duration identical to that of the corresponding monitored ARM signal pulse. Suitable for use as the zero-crossing detector is a device manufactured by Motorola under model number MC3403.

In addition to the control terminals of sample-and-hold detectors 180 and 182, the output of zero-crossing detector 184 is connected to signal identification network 186 comprising a modulation characteristic (recurrence rate and duty cycle) discriminator 188 and percentage acceptance integrator 190. The discriminator 188 detects the presence of a signal having a duty cycle and recurrence rate identical to that of the electric field generator. The percentage acceptance integrator 190 determines whether the modulation characteristic of the detected signal meets the predetermined reference modulation characteristic and whether or not the signal is transient. A detailed circuit description of the signal identification network 186 is given in FIG. 6A.

Figure 7A:
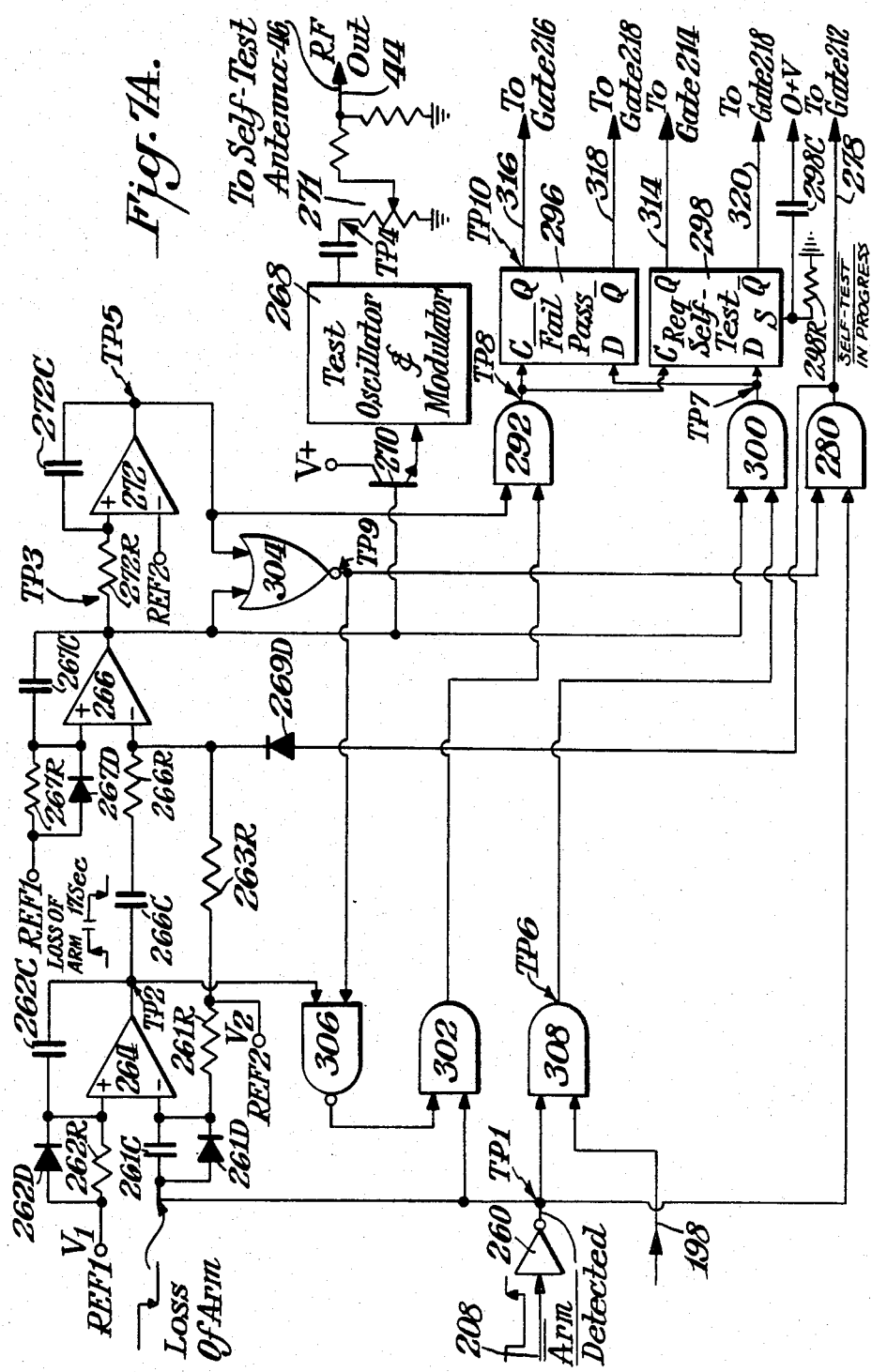

The sampled and held signal levels at the output of detector 182 are applied to one input terminal of a SAFETY threshold detector 194 with a level set 196 attached to the other. The detector 194 is typically a comparator or an operational amplifier such as that sold by Motorola Inc. under model 3403. The level set 196 provides a constant reference voltage level that is no higher than that necessary to disable the machine at a point no closer to the machine than the outer limit of the hazard zone, FIGS. 3A and 3B. If the sampled signal from the detector 182 exceeds the reference at the inverting input of the comparator 194, the indicator MACHINE DISABLE signal on the line 32 is generated (which is independent of the ARM signal identification function performed by the network 186). The indicator MACHINE DISABLE signal is applied on a line 198 to the self-test network 46 (FIG. 7A). In a similar fashion, the ARM threshold detector circuit 202 having a level set 204 produces an indicator precursor signal to one terminal of NAND gate 206 when the transmitter signal is sufficiently strong at the outer boundary of the arming zone, FIG. 3. The device 202 is similar to the device 194.

Provided the induced signal has been acceptably identified, a signal from the output of signal identification network 186 will be applied to the second terminal of the NAND gate 206 resulting in a logic low signal ARM DETECTED at the output terminal of the gate 206. The ARM DETECTED signal on the line 208 is applied to the self-test network 46 (FIG. 7A).

The ARM DETECTED signal in turn results in an output on the line 38 of the indicator MACHINE ENABLE to the machine interface controller 28, unless prevented by one of the gates 212, 214 or 216. AND gate 212 functions to prevent machine enabling while a self-test is in progress; AND gate 214 functions to prevent machine enabling should self-testing show a fault in any channel of the machine-guard system; and AND gate 216 prevents machine enabling before a self-test has been completed upon start-up of the machine. If the system fails a self-test sequence or if a self-test is required, a NOR gate 218 forms a RESET REQUIRED signal which indicates to the operator that he must reset the controllers before machine operation can again be allowed.

Figures 6A, 6B:
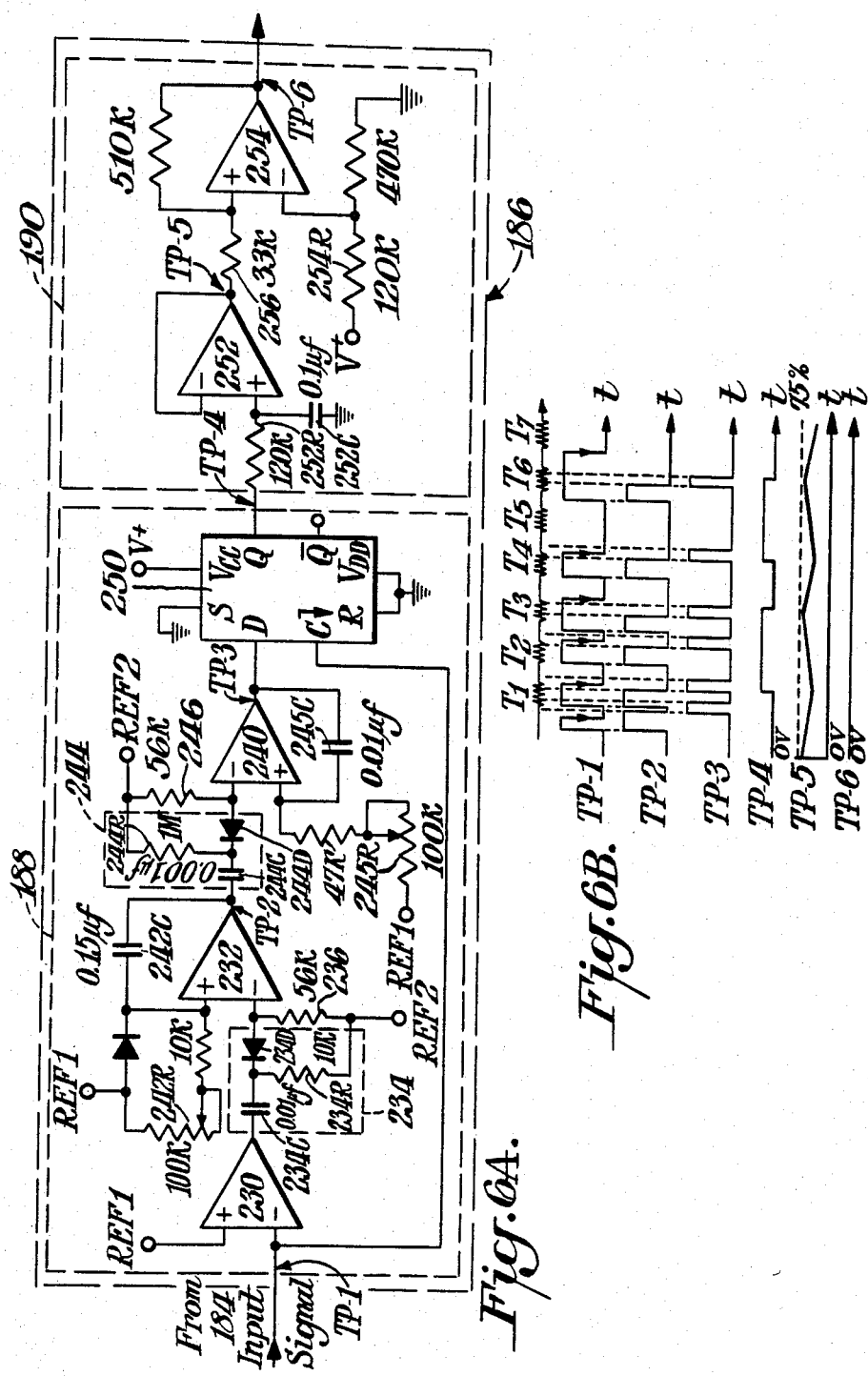
FIG. 6A is a schematic diagram of a portion of the control logic network shown in FIG. 5 illustrating the signal identification network and the acceptance network while FIG. 6B indicates the waveforms of signals present at predetermined locations in FIG. 6A.

FIG. 6A shows the circuit details for the signal identification network 186 with explanatory waveform characteristics of the signal conditions at the corresponding numbered locations being shown in FIG. 6B.

This circuit operates to create a repetitive window, or gate, timed in such a way to capture one of the two edges defining a repetitive pulse signal that characterizes the induced signal having the predetermined modulation characteristic. During the gating interval, the leading or trailing edge (but not both) of each pulse in the induced signal will be gated, but pulses not having edges falling within this period will not. In addition to modulation characteristic discriminator circuit 188, the network includes a percentage acceptance integrator circuit 190 for determining whether the number of pulse edges detected within a prescribed time limit has met the acceptance criterion.

The input signal, the waveform at TP-1 (FIG. 6B) from zero-crossing detector circuit 184, is input to a comparator 230, typically configured from a device sold by Motorola under model number MC13403CP operational amplifier, where it is compared with a first reference level, typically seven volts. The comparator 230 inverts the signal and passes it to a frequency determining one-shot circuit 232 through a pulse-shaping network 234, comprising the combination of a 0.01 microfarad capacitor 234C, a 10K ohm resistor 234R and a diode rectifier 234D, typically a IN4148.

In operation, the pulse-shaping network 234 forms a negative edge-trigger pulse from the leading edge of each input pulse and applies it to the inverting terminal of the amplifier 232, typically a MC13403CP, across a 56K ohm resistor 236. A second reference level, typically nine volts, biases the input signals to both the amplifier 232 and an operational amplifier 240 (identical to the amplifier 232) so that two volt pulse signals, each having constant duration, are formed in response to the trigger pulses as depicted by the waveform at TP-2 (FIG. 6B). The pulse duration is a function of both the value of a capacitor 242C and the resistance value of the duty cycle set potentiometer network 242R, comprising 100K ohm and 10K ohm resistors, respectively. Pulse duration is adjusted manually such that it is just short of the ideal transmitted pulse length.

In a similar fashion, the pulse-shaping network 244, comprising a 0.001 microfarad capacitor 244C, a 1M ohm resistor 244R and a diode rectifier 244D (identical to the rectifier 234D), generates a second negative edge trigger signal upon the occurrences of the trailing edges of each pulse in the waveform at TP-2 and impresses these trigger pulses onto the inverting terminal of the amplifier 240 across 56K ohm resistor 246. The constant value duration of the generated pulses by the window-one-shot circuit 240 is accordingly established by the resistance values of the duty cycle tolerance and recurrence rate tolerance set potentiometer 245R, comprising 100K ohm and 47K ohm resistances, respectively, plus the value of capacitor 245C, typically 0.01 microfarad. The window pulses so generated, waveform at TP-3 (FIG. 6B) are arranged to overlap the trailing edge of the hypothetical ideal transmitted pulses as depicted above the first waveform by the alphanumerics T1, T2, T3, T4, T5, T6 and T7.

Flip-flop 250, typically a device sold by Motorola under model number MC14013CP, serves to sample and hold the trailing edge occurrences of input waveform at TP-3 applied to its data terminal wherever these occurrences are clocked by the trailing edges of waveform at TP-1. It is evident that the duration of the positive portions of the square-wave output waveform at TP-4 at terminal Q of flip-flop 250 is indicative of the degree of correlation between the received signal and the transmitter signal.

The percentage acceptance integrator circuit 190 comprises an integrator circuit 252 and a serially connected threshold circuit 254. The function of the percentage acceptance circuit 190 is to measure the degree of correlation between the actual signal and the ideal transmitter signal as indicated by waveform at TP-4 and generates a logic value signal when a predetermined degree of correlation has been attained. This latter signal, the waveform at TP-6, controls the NAND gate 206 (FIG. 5) and thus the passage of the indicator MACHINE ENABLE signal to the machine interface circuit 28. The integrator 252 uses an operational amplifier, typically a device sold by Motorola under model number MC13458CP, and an RC network consisting of a 120K ohm resistor 252R and 0.1 microfarad capacitor 252C connected to its noninverting terminal to integrate the correlation signal waveform at TP-4, and generate a degree of correlation signal waveform at TP-5. The waveform at TP-5 is transmitted through a 33K ohm resistor 256 to the threshold circuit 254 which applies a voltage reference, provided by the voltage divider 254R, formed by the 120K ohm and 470K ohm resistances, respectively, for a comparison value to the inverting terminal of an operational amplifier 254, such as a device sold by Motorola as model number MC13458CP. In the example shown, the integrator output signal at TP-5 is not sufficient to cross the approximately eighty percent acceptance level threshold established by resistors forming the divider 254R and consequently the waveform at TP-6 does not go positive.

To summarize, the function of the signal identification network is to isolate a signal of interest from an electromagnetic interference noise background or from other signal sources, in order to establish the validity of a received signal.

SELF-TEST NETWORK

Figure 7B:
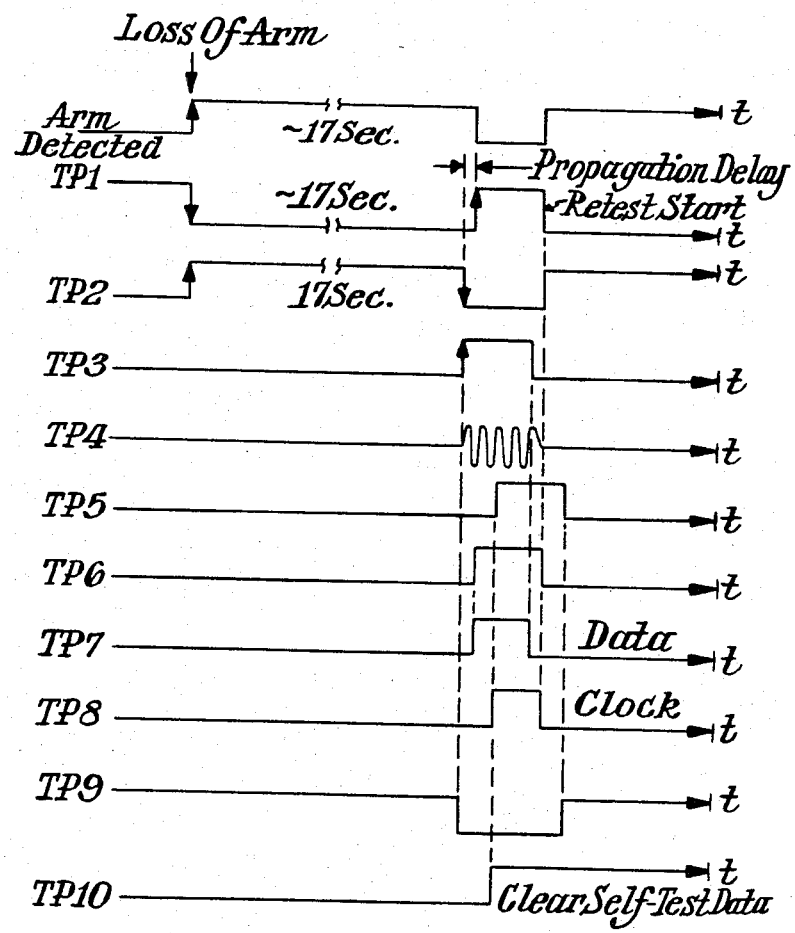
FIG. 7B is a timing diagram indicating the sequence of operations of the network shown in FIG. 7A.

The self-test network 42 (FIG. 1) is operative to apply a signal of known intensity to the self-test antenna 46 which varies at the predetermined radio frequency and exhibits the predetermined modulation characteristic to verify the operation of the machine tool safety system. FIG. 7A is a schematic diagram of the self-test network while FIG. 7B is a timing diagram illustrating the chain of events that occur during a self-test sequence.

The self-test sequence occurs during system start-up or commences with a loss of the ARM DETECTED signal on the line 208 (FIG. 5). The signal ARM DETECTED on the line 208 is normally low when the ARM signal is asserted. A loss of the ARM DETECTED signal would result, e.g., when the operator temporarily opens the switch 56 (FIG. 2A) on the electric field generator 20, when the equipment is turned-on or when a signal from the electric field generator is either not present or is out of range. This occurrence causes the signal output from the inverter 260 (ARM DETECTED-NOT) to change state to a logic low condition and initiate a three-stage timing sequence.

When the output of the inverter 260 changes state to a logic low, this transition couples a negative-going edge through a capacitor 261C to the inverting terminal of an operational amplifier 264, such as a device manufactured by Motorola and sold under model number MC13403 CP configured as a one-shot. The output from the one-shot 264 provides the first stage timing signal which establishes a predetermined time interval, conveniently seventeen seconds, between self-test sequences. The slope of the negative-going edge of the signal input to the amplifier 264 is governed by the values of the capacitor 261C and a resistor 261R. Since the reference voltage $V_2$ to the amplifier 264 is normally higher than the reference voltage $V_1$, the output of the amplifer 264 is normally in a logic low state. However, the appearance of a negative edge at the inverting terminal of the amplifier 264 changes the output thereof to a logic high state. The duration of the logic high output is maintained by the values of a capacitor 262C and a resistor 262R. Since the voltage level corresponding to a logic high state at the output of the amplifier 264 is coupled to its noninverting input through the capacitor 262C, the voltage at that terminal remains higher than the reference voltage $V_2$ for a period determined by the rate of discharge of the capacitor 262C through the resistor 262R. The diode 261D serves to terminate the logic high state at the output of the amplifier 264 whenever the output of the inverter 260 goes high (indicating that the ARM signal has been detected), regardless of whether or not the one-shot 264 has timed out. The diode 262D then serves to rapidly discharge the capacitor 262C to enable the amplifier 264 to be ready to generate a logic high output state upon the next loss of the ARM signal. Should the signal from the transmitter be regained after initiating the self-test sequence, the diode 261D serves to block the initiation of a new self-test timing sequence.

When the pulse from the one-shot 264 times out, the negative-going trailing edge thereof triggers a one-shot 266 similar to the device 264. The one-shot 266 outputs a second timing signal, a pulse (logic high state) having a second predetermined duration (preferably 0.8 second) which is applied to various points in the self-test network.

Briefly described, a capacitor 266C conducts the negative edge of the first timing signal from the operational amplifier 264 to the inverting terminal of the operational amplifier 266 by way of a resistor 266R and causes the voltage at the inverting input of the amplifier 266 to drop below the voltage at its noninverting terminal. Thus a logic high state is present at the output of the one-shot 266. The length of time this logic high state is sustained is determined by the values of a capacitor 267C and a resistor 267R, similar to the functioning of the capacitor 262C and the resistor 262R for the operational amplifier 264. Resistors 266R and 263R and the capacitor 266C also determine the slope of the negative-going edge of the input triggering signal from the amplifier 264. A diode 267D provides a discharge path for the capacitor 267C to rapidly prepare the amplifier 266 for the next timing cycle. A diode 269D serves to admit a logic high signal from an AND gate 280 to abort the timing of the amplifier 266 and the initiation of the self-test sequence through the one-shot 264, mentioned earlier to meet normal operating demands.

The output from the one-shot 266 triggers a test oscillator 268 through a power amplifier 270, such as a device manufactured by Motorola under model number 2N2222. The test oscillator 268 is configured similar to the electric field generator 20 (FIG. 2) and generates excitation signals which, when applied to the self-test antenna 46 through an attenuator 271, stimulates the receiver to the same response as would actual transmissions from the electric field generator 20. Accordingly, upon the occurrence of the pulse from the one-shot 266, the MACHINE DISABLE and ARM DETECTED signals should appear on the lines 198 and 208 (FIG. 5).

The third stage timing signal is provided by an operational amplifier 272 and is delayed from the self-test pulse generated by the one-shot 266 for a time sufficient to cover the system propagation delay. Operational amplifier 272 acts as a delay pulse generator and is activated by the leading positive-going edge of the second timing signal generated by the one-shot 266. A network comprising a resistor 272R and a capacitor 272C determines the delay time. This third timing signal (the delayed pulse) is applied through an AND gate 292 and provides a clock input edge to two flip-flops 296 and 298. Suitable for use as the flip-flops are devices manufactured by Motorola under model number MC 14013CP. The flip-flop 298 is set with its Q output to a logic low state through a capacitor 298C and a resistor 298R at turn-on of the system. The other flip-flop 296 is used for pass/fail of the self-test sequence. If the signal at the data input of the flip-flop 296 is high and the later-arriving positive-going clock edge appears, self-test is passed. If the data input is low and the later-arriving clock edge appears, self-test fails. When logic low states are present at either one or both Q output terminals of the flip-flops 296 and 298, the AND gates 214 and 216 (FIG. 5) operate to disable machine operation until cleared by a manual reset when normal system operation is resumed. An AND gate 300 prevents the transfer of data pulses during normal operation whereas an AND gate 302 prevents the transfer of clock pulses during normal operation.

The signals from the one-shot 266 and from the delay pulse generator 272 are joined by a NOR gate 304. The output of the gate 304 is applied to the control AND gate 280 and to a NAND gate 306. When activated, the output from the gate 306 prevents the machine tool from becoming operable during the self-test sequence by generating a control signal through the gate 302 which disables the gate 292 to prevent clocking of the flip-flops 296 and 298.

The AND gate 292 combines the output from the delay pulse generator 272 with the output from the AND gate 302. The output of the gate 292 generates a pulse, the leading edge of which simultaneously clocks the flip-flops 296 and 298.

The data inputs to the flip-flops 296 and 298 are derived from the output of the AND gate 300 which itself derives its inputs from the one-shot 266 and the output of an AND gate 308. The output of the gate 308 is asserted if the simulated operating signal from the test oscillator 268 results in the generation of both an ARM DETECTED and MACHINE DISABLE signal.

The AND gate 302 provides a logic high level output when self-test standard has been met by the signal processing sections, FIGS. 5 and 6A. When the AND gate 300 receives a logic high signal from the gate 308 and a logic high signal from the one-shot 266 a logic high state is produced at the output of the gate 300 indicating a test is in progress and that the test conditions have been met. The logic high output from the AND gate 300 applies to the data input terminal of the flip-flops 296 and 298 a logic high which is immediately clocked by the later-developed clock pulse rising edge emanating from the gate 292. The gate 292 outputs a logic high when the delay timer 272 pulse is high and the AND gate 302 output is high. The gates 302 and 306 together serve to block clock pulses if a self-test is not in progress. In such a case, the gate 302 outputs a logic low to prevent the transfer of clock pulses from the timer 272 to the clock input terminals of the flip-flops 296 and 298. With the exception of those instances when the output of the inverter 260 is high, the timer 264 output is low, and the delay timer 272 output is high, all other combinations of the various timer and arm function levels are rejected.

The NOR gate 304 serves to disable the AND gate 280 during self-test, since the timers 266 and 272 together or independently are in a logic high state during this period. Consequently, the signal output from the gate 280 goes to a logic low to indicate SELF TEST IN PROGRESS-NOT on the line 278 to the gate 212 (FIG. 5).

A logic high signal at the Q output at the flip-flops 296 and 298 is applied over output lines 314 and 316 to enable gates 214 and 216 (FIG. 5). Thus, if the system passes each of the self-tests, the indicator MACHINE ENABLE on the line 38 may be asserted and the machine tool operated. The Q-NOT terminals of the flip-flops 296 and 298 are applied over lines 318 and 320, respectively, to the gate 218 (FIG. 5) indicating a reset of the system is required (RESET REQUIRED). Further, failure of a self-test disables the gates 214 and 216 thus preventing the assertion of a MACHINE ENABLE signal. It should be noted that when the system is initially energized a RESET REQUIRED appears.

If the particular embodiment of the machine tool safety system utilizes two channels, the self-test networks for those channels will interact by applying the output of the one-shot 266 to the corresponding gate 306 in the self-test network for the second channel.

MICROCOMPUTER CONTROLLED RECEIVER AND SIGNAL PROCESSOR

Shown in FIGS. 8 through 17 is a firmware-based microcomputer-controlled implementation of the signal processor arrangement useful in connection with the present invention. The microcomputer-controlled receiver 24' used in connection with the control logic network 26' contains an array of amplifier stages and peak detectors which are sampled under the control of the microcomputer. In this manner the microcomputer-controlled signal processor 23' measures the magnitude of the sampled signal peaks at each amplification stage and selectively converts the results into decibel form for comparison with predetermined and calibrated threshold levels to generate machine control indicators.

With reference to FIG. 8 a generalized block diagram of the microcomputer-controlled signal processor for a two channel safety system is shown. In FIG. 8 the signal from each of the electric field generators 20 worn by the machine operator is carried from the capacitive receptor antenna 21 (FIG. 3) over the coaxial cable link 22 into the high impedance input of a common radio frequency amplifier 330. The amplifier 330 is configured to provide approximately ten decibels of gain. The output of the amplifier 330 is carried over lines 332 each leading to a receiver 24', with one receiver 24' being provided for each of the wrist transmitters utilized in the particular implementation of the invention.

Although shown in FIG. 8 are two receiver channels 24'A and 24'B, it is to be understood that any predetermined number of receivers, corresponding to the number of electric field generators utilized in the particular implementation of the machine tool safety system are deployed. In the description that follows herein only the receiver 24'A and associated elements for one channel of operation (corresponding to one electric field generator) are described. However, the circuit configuration and operation for other receiver channels (if provided) are identical. (In the program listing appended hereto and made part hereof, the two channels A and B are referred to as channels 0 and 1, respectively. In the discussion of the program which follows, the suffix "X" following a register label indicates that the register is associated with the channel of interest.)

Each receiver 24' is operatively associated with the microcomputer 460 (FIG. 12) disposed within the control logic network 26' by control lines 334 and 336. In addition, each receiver 24' is operatively connected to a multiplexing analog-to-digital converter 338 by lines 340, 342, 344 and 346. Suitable for use as the converter 338 is a device sold by National Semiconductor Corporation under model number ADC0809CCN. The converter 338 is connected to the microcomputer for its synchronization and timing over a set of control lines which are collectively indicated by the reference characters 348 and 349. In addition, the eight-bit data from the converter 338 flows unidirectionally over a bus 350 to the microcomputer 460, when addressed over lines 470, and transmitting a convert complete signal on a line 461. The converter 338 is also connected to an array of potentiometers 352 (ARM), 354 (SAFETY LEVEL), 356 (SELF-TEST HIGH) and 358 (SELF-TEST LOW). The microcomputer 460 (FIG. 12) is also connected to a self-test generator 42' over control lines 362 and gain control lines 364. The signal from the self-test generator 42' is carried over a transmission line 44 to the self-test antenna 46.

The control logic network 26' receives machine tool status signals and service requests over an array of conductors 366. Control indicators, such as MACHINE ENABLE and MACHINE OVERRIDE are output from the control logic network 26' to the machine interface 28 over an array of output lines 368.

Each receiver 24' includes a first mixing stage 372 and a second mixing stage 374 coupled through a filter network 376. The output of the second mixing stage 374 is serially applied through an array of amplifiers 378, 380 and 382, respectively. The output of the second mixer 374 and each amplifier stage 378, 380 and 382 is connected to a peak detector 384, 386, 388 and 390, respectively. The peak detectors are respectively coupled to the converter 338 over the lines 340, 342, 344 and 346.

Figure 9:
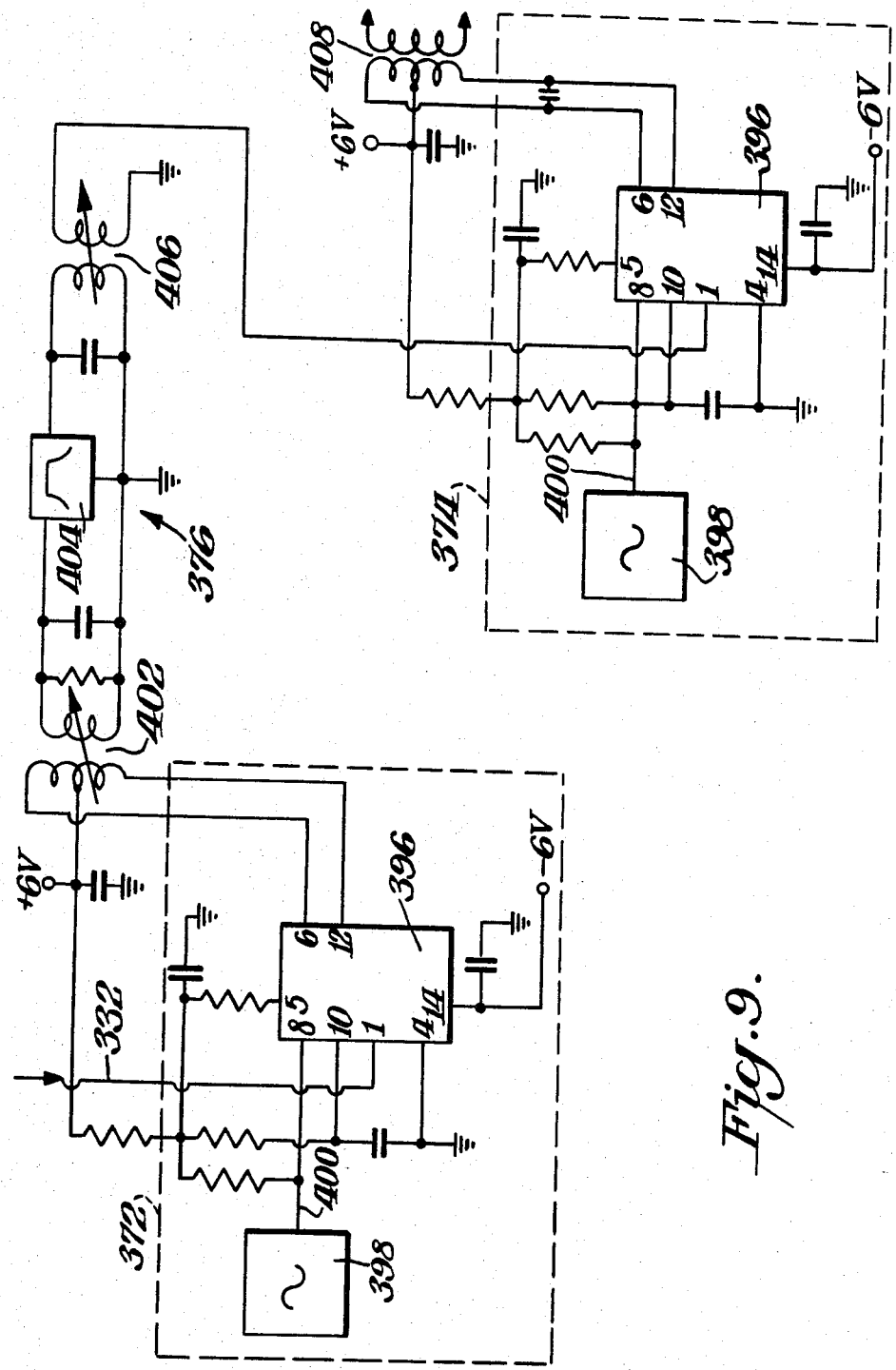
FIG. 9 is a schematic diagram of the oscillator-mixer and filter stages used in the receiver of the embodiment of the present invention having a microcomputer controlled signal processor.

FIG. 9 is a detailed schematic diagram of the first and second mixing stages 372 and 374, respectively and of the filter network 376. Each of the mixing stages includes a mixer element 396 such as that manufactured by National Semiconductor and sold under model number LM-1496N. A crystal controlled local oscillator 398 is connected by a line 400 to the mixing element in each of the stages. The stages 372 and 374 operate in sequence to translate to a first intermediate frequency of 10.7 megahertz down to one hundred kilohertz. Both stages use high side injection. The filter network 376 is a 10.7 megahertz crystal filter primarily used to reject the adjacent channel. The output of the second stage mixer 374 is coupled by a tuned transformer 408 to the first amplifier stage 378 (FIG. 10).

Figure 10:
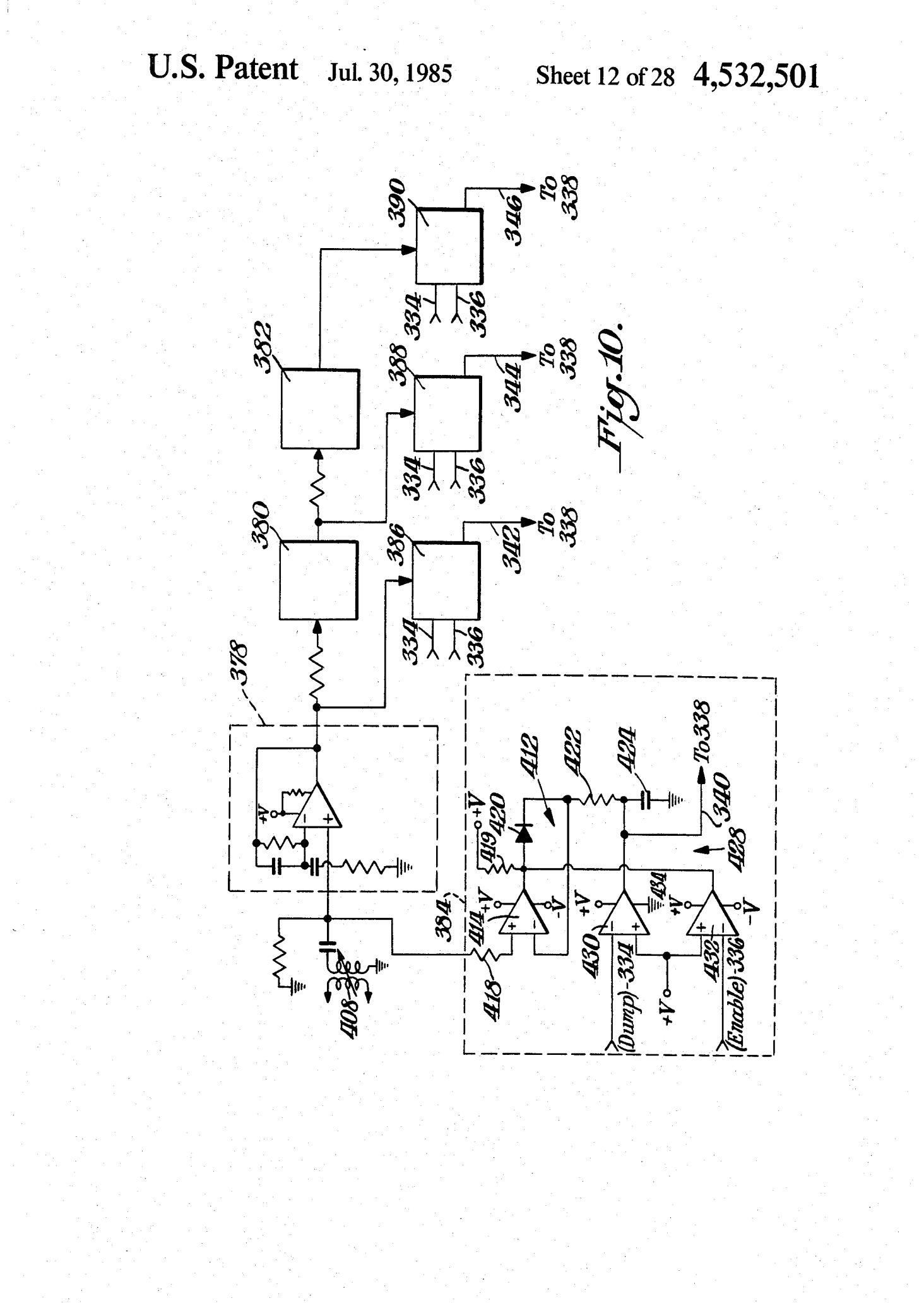

As shown in FIG. 10 each amplifying stage 378, 380 and 382 is an intermediate frequency amplifier designed to pass the one hundred kilohertz signal output from the second mixer stage 374. Suitable for use within each amplifying stage is a current mode saturating type operational amplifer such as that manufactured by RCA under model number CA3080. This operational amplifier is selected because it provides excellent linearity and (fast) recovery characteristics well into its saturation limit. Each IF amplification stage is configured to give 19.5 decibels of gain. The last operational amplifier (in the amplification stage 382) will saturate first as signal strength progressively increases and each of the preceding amplifier circuits saturates progressively toward the front end of the receiver.

FIG. 10 also shows a detailed schematic diagram of the peak detector circuit 384. Each of the other peak detector sample and hold circuits 386, 388 and 390 are identical to the detector 384. Peak detector 384 includes a peak-detect sample and hold network generally indicated by reference character 412 and a comparator arrangement generally indicated by reference character 428.

The sample and hold network 412 includes a comparator 414 such as that manufactured by National Semiconductor under model number LM339. The input of the comparator 414 is connected to the output terminal of the coupling transformer 408 or the preceding IF stage through a current limiting resistor 418. The output of the comparator 414 is connected through a diode 420 and a resistor 422 to a capacitor 424.

The comparator network 428 includes first and second comparators 430 and 432, respectively. The noninverting inputs of each of the comparators 430 and 432 are connected to a positive biasing voltage. The inverting terminal of the amplifier 430 is connected over the control line 334 (DUMP) to the microcomputer (FIG. 12). The inverting terminal of the comparator 432 is connected over the control line 336 ENABLE output from the microcomputer. The output of the comparator 430 is connected to the capacitor 424 and over the line 340 to the analog-to-digital converter 338. Similarly, the output signals from the peak detectors 386, 388 and 390, respectively pass over lines 342, 344 and 346 to the converter 338.

As is discussed herein in connection with the operation of the microcomputer controlled receiver and control logic network, before a voltage to be measured is impressed across the capacitor 424 the microcomputer generates a ten microsecond DUMP signal applied on the line 334 to allow the charge resident on a capacitor 424 to drain to ground via the comparator 430, as indicated by the arrow 434. Thereafter the microcomputer 460 disables the comparator 432 by signal over the line 336 thus enabling the peak detector comparator 414. More specifically the change in the output state of the comparator 432 allows the comparator 414 to function normally as a peak detector. So long as the positive input of the comparator 414 is greater than its inverting terminal input, the comparator 414 is in an open collector state allowing current to flow through the resistor 419, the diode 420 and the resistor 422 to charge the capacitor 424. Thus, at the end of a sample time the voltage across the capacitor 424 represents the positive peak value of the signal at the positive input of the comparator 414.

Figure 11:
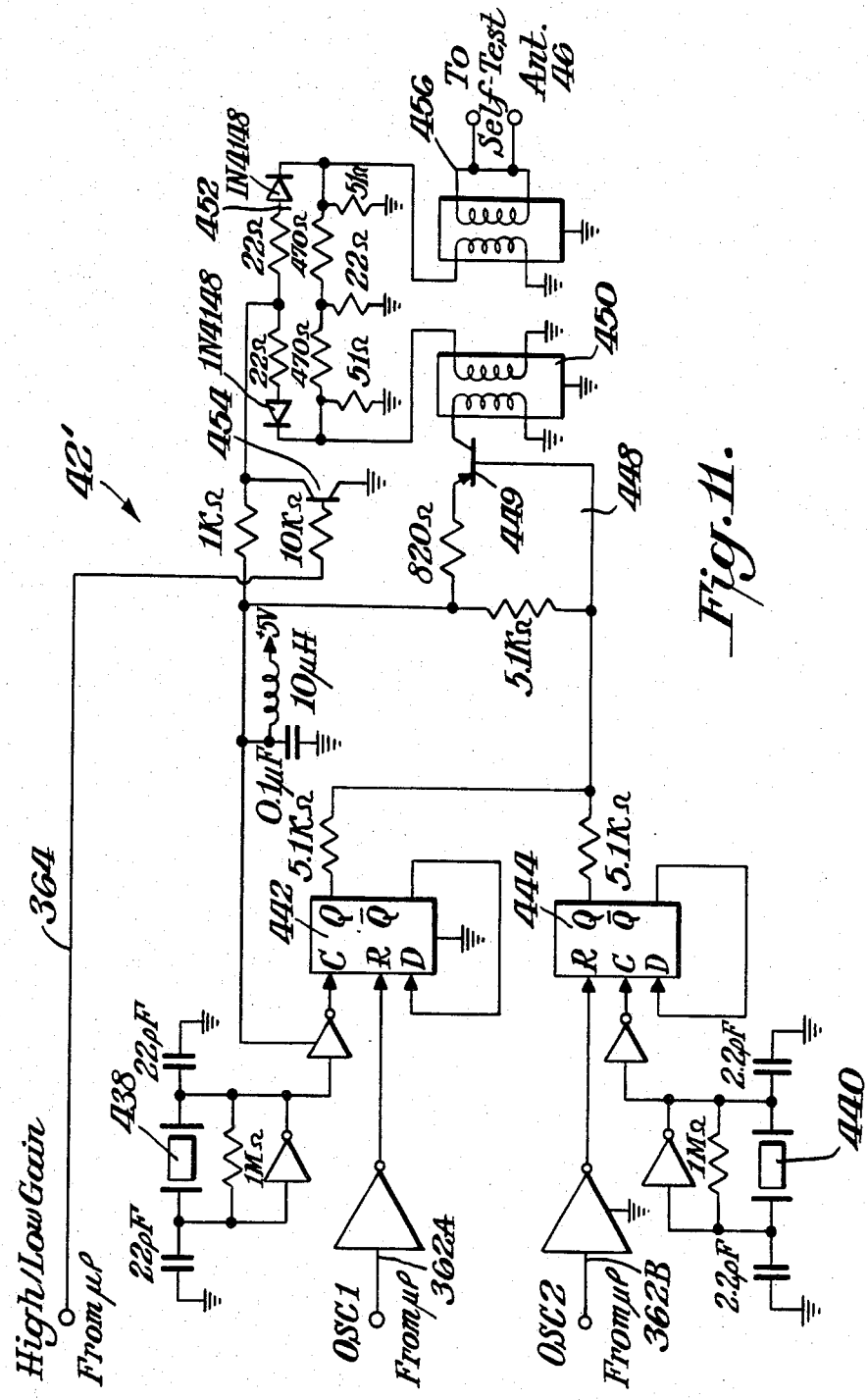
FIG. 11 is a schematic diagram of a self-test transmitter network used in connection with the embodiment of the present invention having a microcomputer controlled signal processor.
Figure 14:
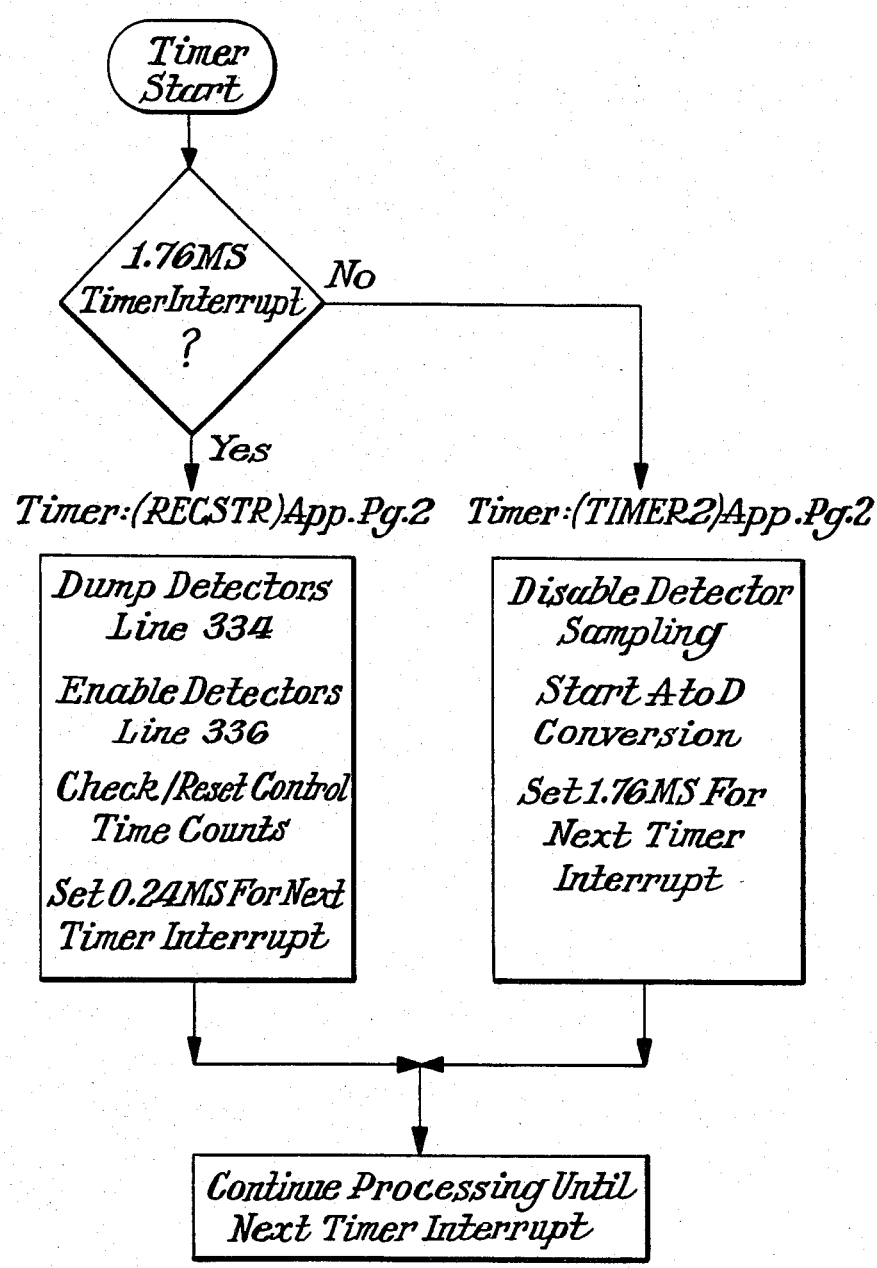

With reference to FIG. 11 the self-test signal generator 42' useful in a two channel, microcomputer controlled, signal processor is shown. The self-test signal generator includes two crystal controlled oscillators 438 and 440, respectively, each associated with one receiver channel. The oscillators drive clocked flip-flops 442 and 444, respectively. The flip-flops 442 and 444 are each configured in a divide-by-two mode. Suitable for use as flip-flops 442 and 444 are CD devices manufactured by RCA and sold under model number 4013. The reset terminals of each of the flip-flops is controlled by a control line 362 from the microcomputer 460. Pulsating outputs from the flip-flops 442 and 444 (which have a frequency of one-half the rate of the oscillators 438 and 440) are resistively added to feed a common output driver network 448. The driver network 448 typically consists of a 2N2907A transistor amplifier 449. The output of the driver network 448 is applied through a wide band transformer 450 to a gain control network 452 configured from a resistor-diode bridge. The control signal from the microcomputer on the gain control line 364 is applied to the base of a switch 454, typically a 2N2222A transistor. The switch 454 serves to select the particular high level (upper path) or low level (lower path) self-test output signal signalled by the microcomputer. Potentiometers 356 and 358 (FIG. 8) connected to the analog-to-digital converter 338 are adjusted to match within plus or minus one dB the self-test high and low level signals. Once set, deviations of the self-test signal strength more than plus or minus two dB will be recorded as a self-test failure. The self-test signal from the self-test signal generator is applied to the self-test antenna 46 through the coupling transformer 456. The appropriate square wave oscillator 442 or 444 for the channel to be tested is controlled by the control lines 362A and 362B from the microcomputer 460. Of course, depending upon the number of channels used in a particular implementation of the safety system, a corresponding number of self-test signal generator channels may be provided.

With reference to FIG. 12, a block diagram of the microcomputer-controlled control logic network 26' is shown. The control logic network 26' includes a microcomputer 460, such as a microcomputer chip manufactured by Intel Corporation and sold under model number 8039. Timing for the microcomputer 460 is derived from a suitable crystal 462, typically with a resonant frequency of six megaHertz. The microcomputer 460 communicates over an eight bit data bus 464 with an address latch 466 and with a program memory 468. Program addresses from the latch 466 are applied to the memory 468 over an eight bit address bus 470.

The output bus 350 from each analog-to-digital converter 338 used in the system is connected to the address bus 464 of the microcomputer 460. Control signals to each of the converters 338 on the conductors 348 are derived from a converter control network 472 which includes a read controller logic 474 and a divide-by-two circuit 476 to provide the converter 338 clock signal. Inputs to the read controller logic 474 are derived from one address bit carried from the address latch 466 on a line 478 and from the microcomputer 460 on a line 480. The divider circuit 476 is driven by a clock signal on a line 482 from the microcomputer 460. Converters 338A and 338B (in a two-channel system) are read one at a time by a signal from the read controller logic 474 over the control lines 348A or 348B, respectively. A CONVERT COMPLETE signal is sent to the microcomputer 460 by one (and thus the other) of the converters 338 on the line 461.

Information regarding the status of the machine tool is applied to the microcomputer 460 over the conductors 366 input at port P1. Control signals to the receiver on the lines 334 and 336 (FIGS. 8 and 10) emanate from port P2 of the microcomputer controller 460. Signals to the machine interface 28 (FIG. 8) from the microcomputer 460 are carried by a bus 488 to an input/output expander 490, such as that sold by Intel under model number 8243. The expander 490 communicates with a driver 492, as a device sold by Sprague under model number ULN 2803, which in turn communicates with the machine interface over the conductors 368. Outputs from the control logic 26' include the MACHINE ENABLE and MACHINE OVERRIDE indicators. Also output from the expander 490 are the control lines 362 and 364 to the self-test network 42' (FIG. 11).

The operating mode for the machine tool safety system is selected by an operator through the mode select switch 494. The four available operating modes include: processing of signals from transmitter channel A only; processing of signals from transmitter channel B only; processing of signals from transmitter channels A or B (e.g., valid when controlling an elastomer mill); and processing of signals from transmitter channels A and B (e.g., valid when controlling a pipe flanging machine). The microcomputer 460 may be reset, as when entering a mode change or restarting the program after a self-test failure, through a reset line 495.

The operation of the microcomputer-controlled receiver and control logic shown in FIGS. 8 through 12 may be explained in connection with the timing and register sequences diagrams shown in FIGS. 13A through 13E and with the flow charts shown in FIGS. 14 through 18.

The signal output from the electric field generator is basically an interrupted continuous carrier wave (FIGS. 2B and 13A) modulated in accordance with a predetermined modulation characteristic to exhibit a predetermined recurrence rate and duty cycle. In practice, a modulation characteristic using a seventy Hertz recurrence rate and fifty percent duty cycle is preferred. This signal for each channel is linearly processed, filtered and detected by the receiver 24' using the configuration of elements shown in FIGS. 9 and 10 and operating under the control of the microcomputer 460. After conditioning, the induced signal detected by a given channel typically appears as shown in FIG. 13B. The processing of the information contained in the signal received by the receiver 24' is performed by the signal processor 23' operating under the control of the microcomputer 460. The essential steps in signal processing include: (1) synchronizing the processor with the transmitted signal; (2) determining whether a "lock" exists, that is, whether the received signal exhibits the appropriate modulation characteristic; (3) signal level averaging to determine the amplitude of the received signal; and (4) determining the existence of ARM and SAFETY LEVEL conditions.

As a general overview of these processes, reference is invited to FIGS. 13B through 13D. The detected signal for a given channel (FIG. 13B) is sampled during predetermined sample intervals (FIG. 13C). If the modulation characteristic utilizes the preferred recurrence rate of seventy Hertz (period of fourteen milliseconds) there are on the average seven, two-millisecond sample intervals during each fourteen millisecond period (FIGS. 13B and 13C). During each sample interval the detected signal is logarithmically averaged and quantized by the processor by assigning a digital bit (usually a binary 1) if the amplitude of the sampled signal is greater than a running average. The historical results of the quantization for the detected signal during each sample interval are stored in a first register (DATAX register). A second register, the SYNCX register, is also maintained for each channel. Synchronization occurs (and an indication thereof is stored in the SYNCX register) only if a predetermined pattern of bits is developed and stored in the DATAX register. A "lock" may be generated only if the appropriate bit pattern is stored in the DATAX register at the end of the last sample interval and if synchronization has occurred after a minimum of twenty-four pulse repetition intervals. Once "lock" is achieved, the average peak intensity is calculated. This average is maintained in a suitable PKAVGX register and is used to determine whether the ARM condition has been met. Once the ARM condition is met, the SAFETY LEVEL condition is flagged should two successive signal samples exceed the preset SAFETY LEVEL threshold. A complete listing (in assembly language for the Intel Corporation 8039 microcomputer) of the program used by the microcomputer to effect the flow diagram is attached to and made part of this application.

The sequence of activities occurring during each sample interval is shown in FIG. 13D. The sample intervals are asynchronous to the incoming signal to which synchronization and quantization is required. The two millisecond sample interval is subdivided into two subintervals of 0.24 milliseconds and 1.76 milliseconds, respectively. During the first subinterval (FIG. 14) each of the detectors 384, 386, 388 and 390 (FIGS. 8 and 10) are cleared by asserting a DETECTOR DUMP signal on the line 334 (FIG. 10) to drain the charge on the capacitor 424 disposed in each peak detector stage. Thereafter, the detector circuitry is enabled by asserting an ENABLE signal on the lines 336 to the detectors (FIG. 10). (References to the Appendix are indicated in the flow diagrams by the term "APP. PG.___").

As seen from FIG. 13D, during the second subinterval the sample measurements as affected by the detectors are disabled by terminating the ENABLE signal on the lines 336. Thereafter, the analog-to-digital conversion of the output of each detector is requested by the microcomputer 460, starting from highest order detector (the detector 390) and proceeding toward the front of the receiver 24'. The converted value is sent to the microcomputer 460 on the bus 350 and stored in a suitable register, thus quantizing the received signal to a resolution of plus or minus 0.5 dB. The output of the highest-ordered detector in the chain that is not saturated is retained and converted to a logarithmic value lying within the segment of the receiver's zero to eighty-two dB response range allocated to that detector.

Figure 15:
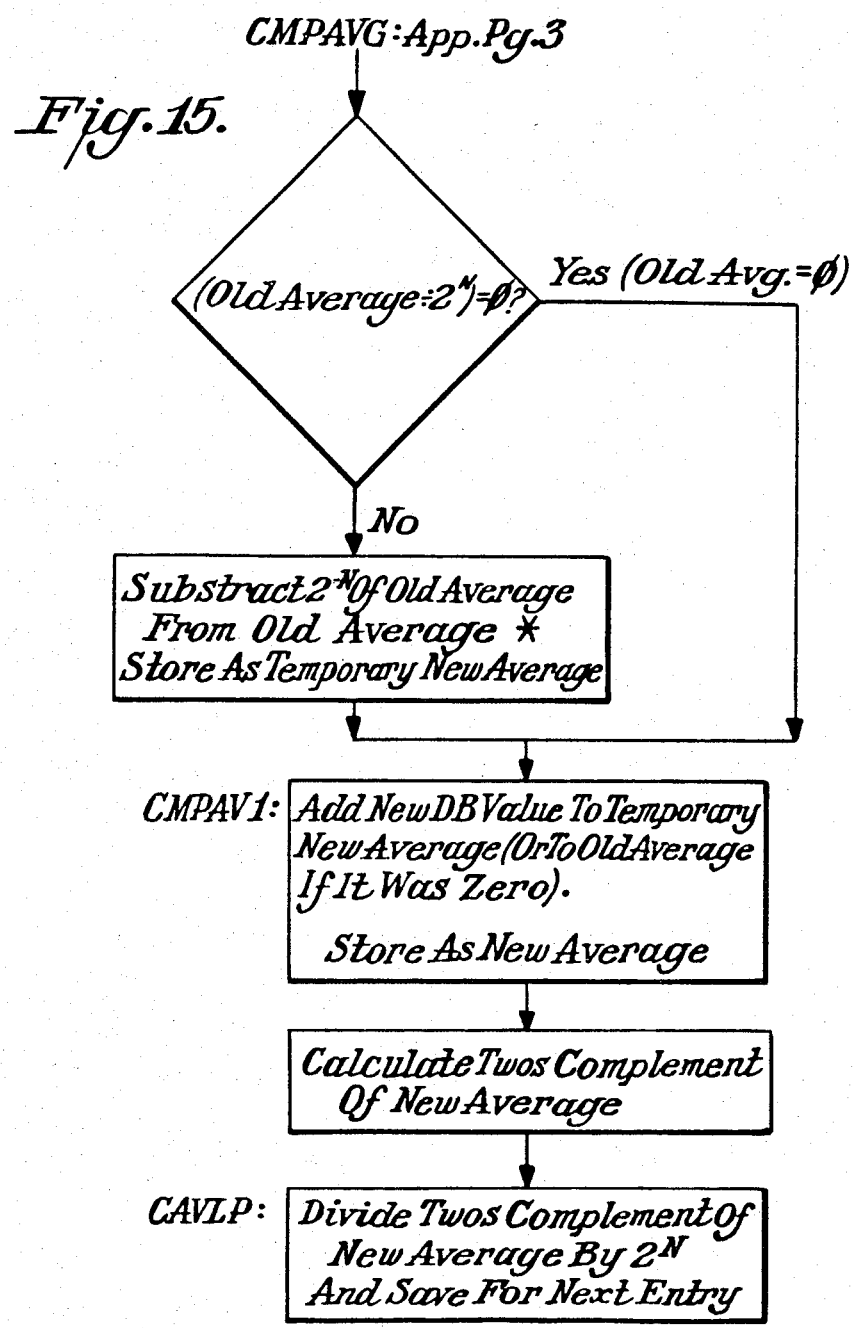

Once the detectors are polled, the running average of the received signal in decibels is computed and maintained as an exponential integration of successive samples to minimize storage requirements and processing time using the routine CMPAVG (FIG. 15). The running average is maintained in the upper two bytes of a three-byte storage register SIGAVX. The lower byte contains the two's-complement of the old running average divided by a number $2^N$, where N typically equals five. After each new sample is received and converted into decibel form, a new average value is calculated. The new average is the sum of the new sample value plus the product of the old average and a number $(1-2^{-N})$. This technique provides integration on an exponential curve similar to that obtained by integrating voltage in a resistor-capacitor electrical network. The equivalent time constant is determined by a specified value N contained in a data register GENCNT. When the CMPAVG subroutine (FIG. 15) is called, the time constant is the product of the sampling interval multiplied by 2 raised to the power N of the number in the GENCNT register. For computing the received signal average, the number five is stored in the GENCNT register, and the time constant is sixty-four milliseconds.

The decision process which determines whether the receiver is synchronized and locked with the recurrence rate of the pulse-modulated signal received from the transmitter is based on the relative timing between each two millisecond sample interval and the recurrence of each pulse leading edge and duration.

No decisions are made affecting safety on a single sample. The purpose of the LKSYNC routine is to determine that synchronization has been established with the incoming modulation signal as indicated by the count in the register LKCNTX. The register LKCNTX is incremented only if three criteria are met: (1) the bit pattern in the least significant bits of the DATAX register is a predetermined bit pattern ("0-0-1") and the SYNCX register is zero (BSYNC); (2) the first sample following the "0-0-1" bit pattern is a one (ONETS); and (3) the fourth sample following the "0-0-1" bit pattern is a zero (ZROTS). Failure of the second or third item will result in decrementing the LKCNTX register. Also the failure to receive another "0-0-1" bit pattern prior to the eighth sample following a valid "0-0-1" pattern will decrement the register LKCNTX.

Lock to the incoming modulation is declared by setting LKFLG when the count in the LKCNTX register exceeds a predetermined number (e.g., twenty-three). The minimum time to lock is a predetermined number (e.g., twenty-four) of periods of the incoming modulation (about 343 milliseconds in the implementation shown). Only after lock is achieved is the magnitude of the signal used to determine the arming indicator. This process is controlled in the ONETS routine by first computing a PKAVGX with an exponential average taken over sixteen samples (GENCNT equal four). When the PKAVGX exceeds the preset arming threshold the ARMFLG is set. With both ARMFLG and LKFLG set the unit is essentially enabled and the machine tool can be activated upon request. ONETS also controls the execution of the SAFTY routine by setting the microcomputer flag FO if the ARMFLG and LKFLG are set.

In the routine SAFTY the value of the latest sample is compared to the present value of the SAFTY level potentiometer. Two successive samples separated by one period of the modulation in time being greater than the preset level will cause the indiator SFTYFLG to be set. The indicator SFTYFLG will disable the machine tool even though the LKFLG and ARMFLG are both set. In the instance where the machine is being activated, the appearance of a SAFTY condition will generate an override function which will force the machine tool to a safe state.

The synchronization and lock decision processing is implemented using the two eight-bit data registers DATAX and SYNCX. The register DATAX is used to maintain a running record of the relative amplitude of the received signal at the sample intervals. The SYNCX register is used as a bit position counter and synchronization status register. With reference to the flow diagrams 16A through 16D, after a received signal is sampled and converted and the signal average computed using the CMPAVG subroutine (FIG. 15), the subroutine LKSYNC is entered (FIG. 16A), the system control flag FO is set to zero and the bit pattern in the DATAX register is shifted left one place. The lowest order bit in the DATAX register is set to a logic one state if the sample value is equal to or greater than the running average stored in the SIGAVX register, otherwise it is zero. The progressive filling of the DATAX register is shown in FIG. 13E for a typical detected signal (FIG. 13B). The occurrence of a "0-0-1" pattern in the three least significant bits of the DATAX register and the SYNCX register being zero are the criteria that determine whether synchronization with the incoming modulation signal zero-to-one transition has occurred.

Figure 16A:
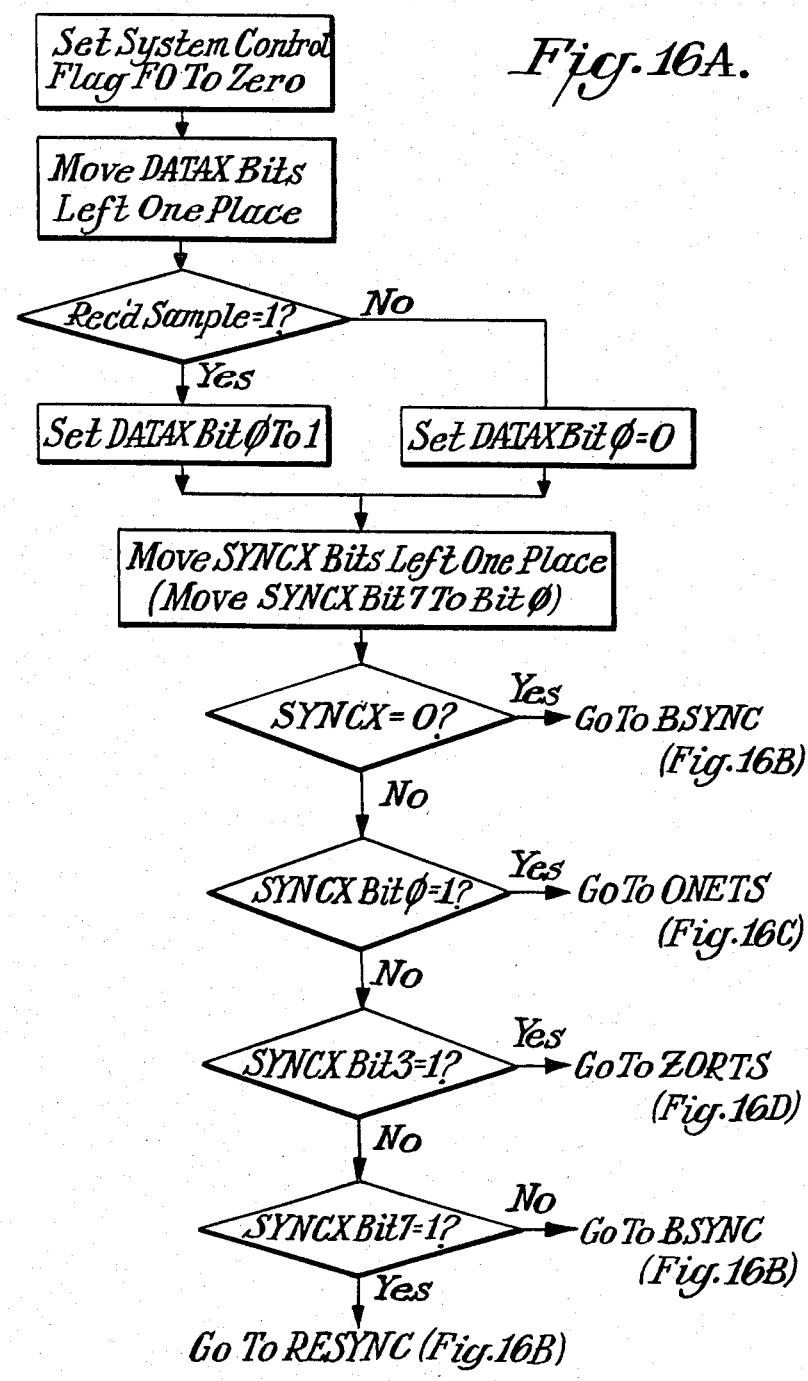

The SYNCX register is used to control processing once a valid "0-0-1" pattern (a pattern that appears while the SYNCX register is zero) in the DATAX register is found. The progressive shifting of the SYNCX register is also shown in FIG. 13E. When the SYNCX register is initally zero, execution is governed by the routine BSYNC (FIG. 16B). On branching from LKSYNC (FIG. 16A) to BSYNC (FIG. 16B) during the third sample interval, the low order bit pattern in the DATAX register is found to be "0-0-1". The most significant bit of the SYNCX register is set to one. When LKSYNC is reentered during the fourth sample interval the left rotation of the SYNCX register moves the logic one to the least significant bit position. Processing is then vectored based on the bit position of the one in the SYNCX register (FIG. 16A).

At the next entry to LKSYNC the ONETS routine (FIG. 16C) is executed to test the least significant bit of the DATAX register for a one. If a logic zero is found and not the expected logic one, the routine RESYNC (FIG. 16B) is entered. The count in a register LKCNTX is decremented (provided the count is greater than zero). If the count in the register LKCNTX is less than sixteen (an arbitrary value) the system flags LKFLG and ARMFLG are set to zero. However, if the least significant bit in the DATAX register should be a logic one, a peak signal average is computed by the subroutine CMPAVG (FIG. 15) in the same manner as for the running signal average except that a different value of GENCNT (equal to four) is used.

The routine ONETS also determines whether the safety system is armed. If the system control flag LKFLG is a logic zero (the system is not "locked" to the received signal, derived as discussed herein) the arm flag ARMFLG is set to a logic zero. When the system is synchronized and locked to the received signal and the computed peak average value is at least one-half dB above the predetermined arm value (as set by the value on the potentiometer 354 (FIG. 8), the flag ARMFLG is set to logic one. If the peak average falls more than 1.5 dB below the ARM threshold, ARMFLG is reset to zero.

The fifth and sixth sample intervals result in the successive shifting of the logic one from the least significant bit position to the BIT-2 position in the SYNCX register. The routine LKSYNC (FIG. 16A) branches to the routine BSYNC during each of these intervals because the SYNCX pattern is either not "1-0-0-0-0-0-0-0" or it is in a state which would select ONETS (FIG. 16C) or ZROTS (FIG. 16D) during these intervals.

Figure 16C:
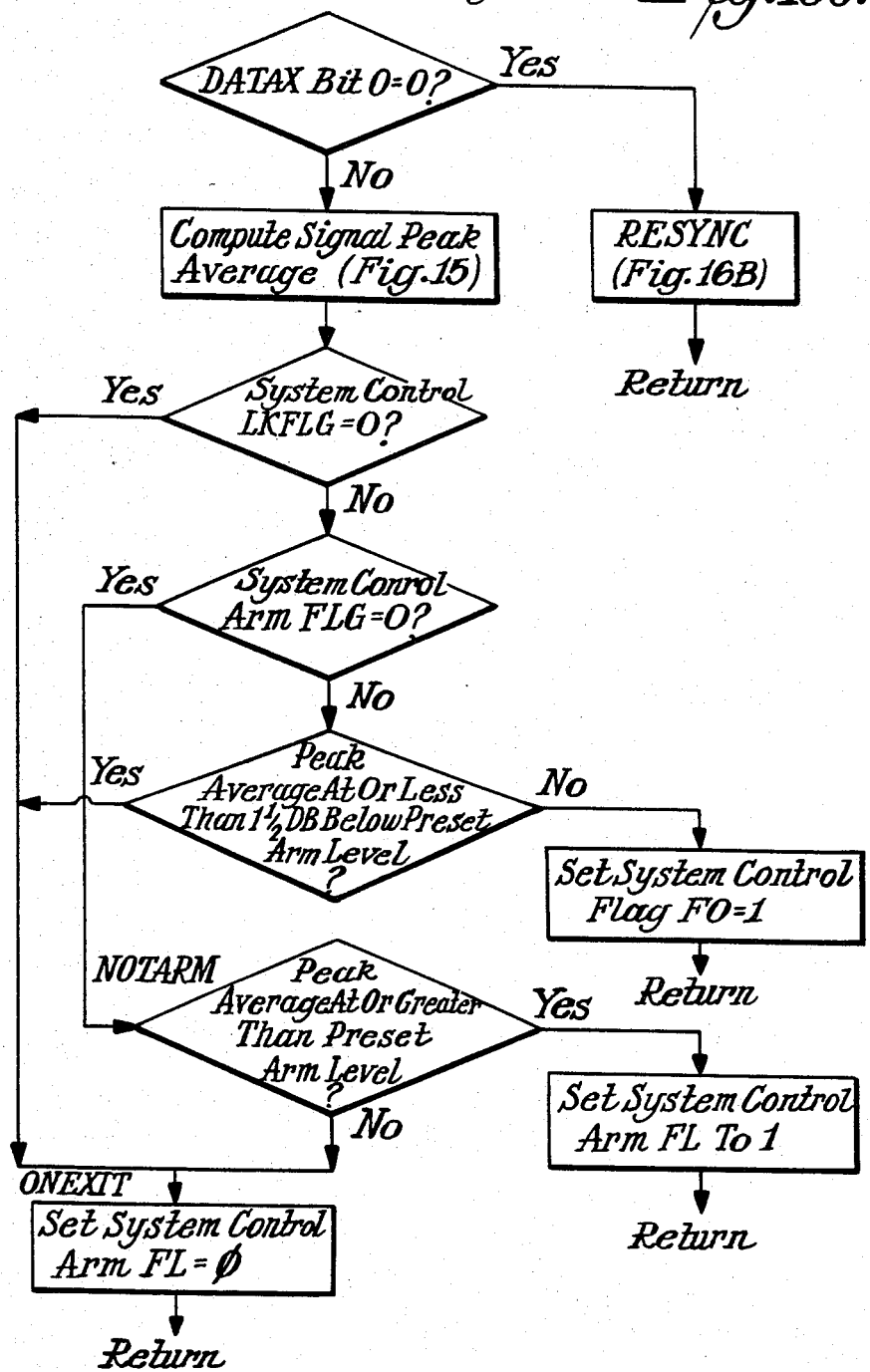
Figure 16D:
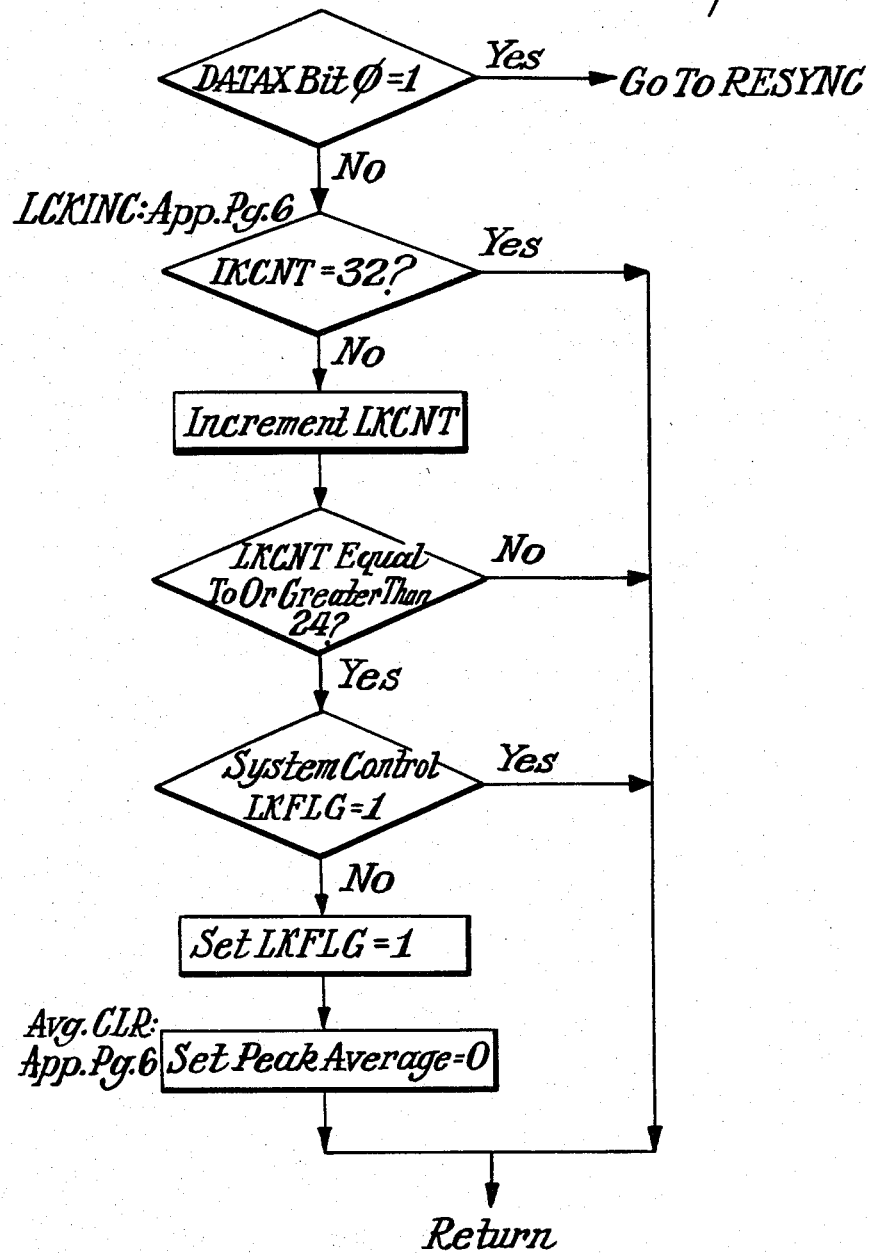

In the seventh sample interval, BIT-3 position of the SYNCX register becomes logic one and processing branches to the routine ZROTS (FIG. 16D). On entry to the routine ZROTS, the least significant bit of the DATAX register is tested. If this bit is not a logic zero, processing branches to the routine RESYNC (FIG. 16B) to decrement the count in the register LKCNTX and begin a search for a "0-0-1" synchronizing bit pattern in the DATAX register by setting the SYNCX register to zero. If the least significant bit is a logic zero, the count in the register LKCNTX is incremented (unless it has been previously incremented to its maximum value of thirty-two). It should be appreciated that LKCNTX can be incremented only once per modulation period if the received signal passes "0-0-1" bit pattern test, the ONETS and ZROTS. When these conditions have been met on successive modulation periods to allow LKCNTX to be incremented to at least twenty-four, the flag LKFLG is set to one. The system is then declared locked. The peak average register is cleared and a new peak average started after "lock" is acquired to improve system noise immunity.

Figure 17:
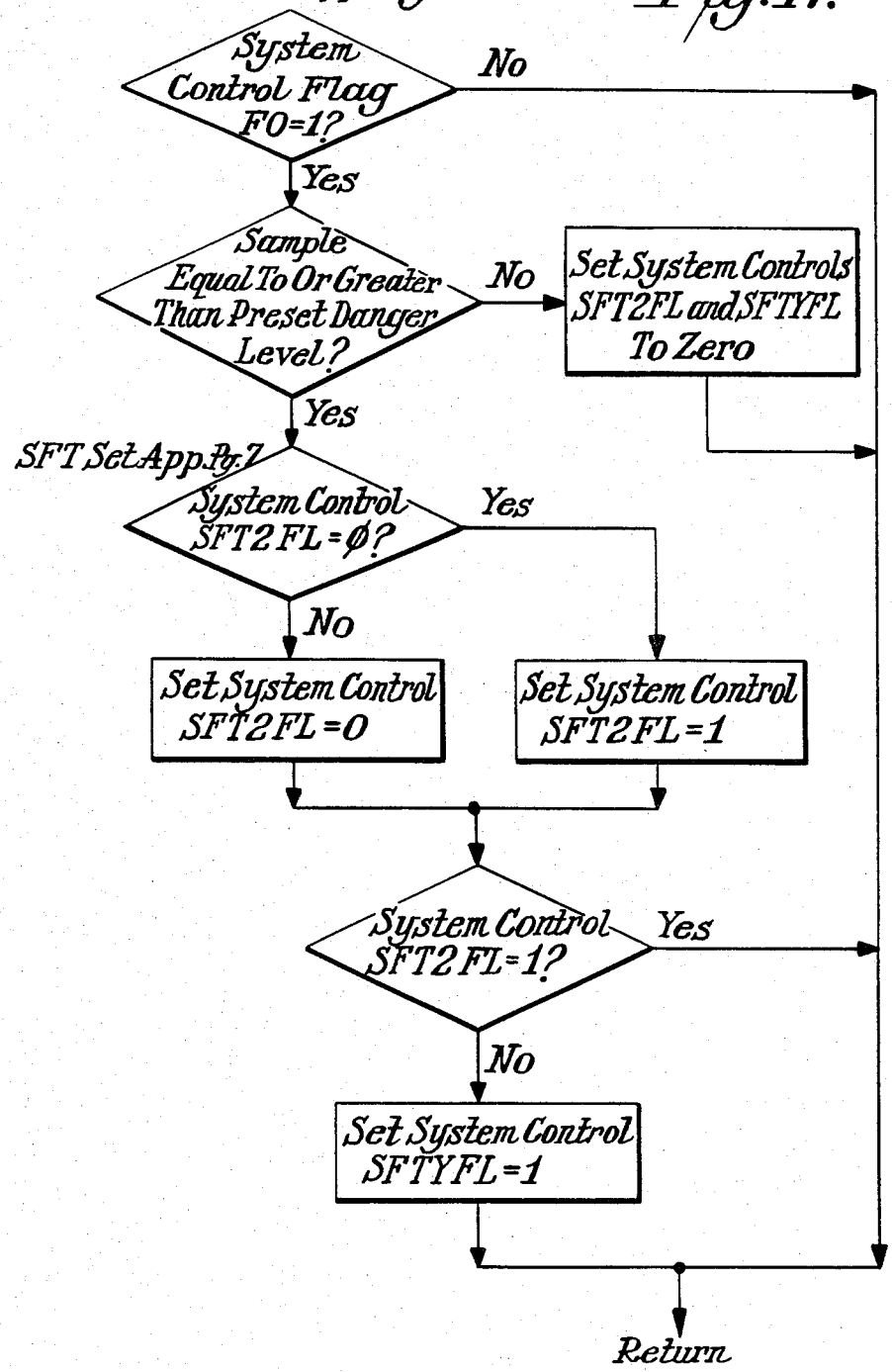
Figure 18A:
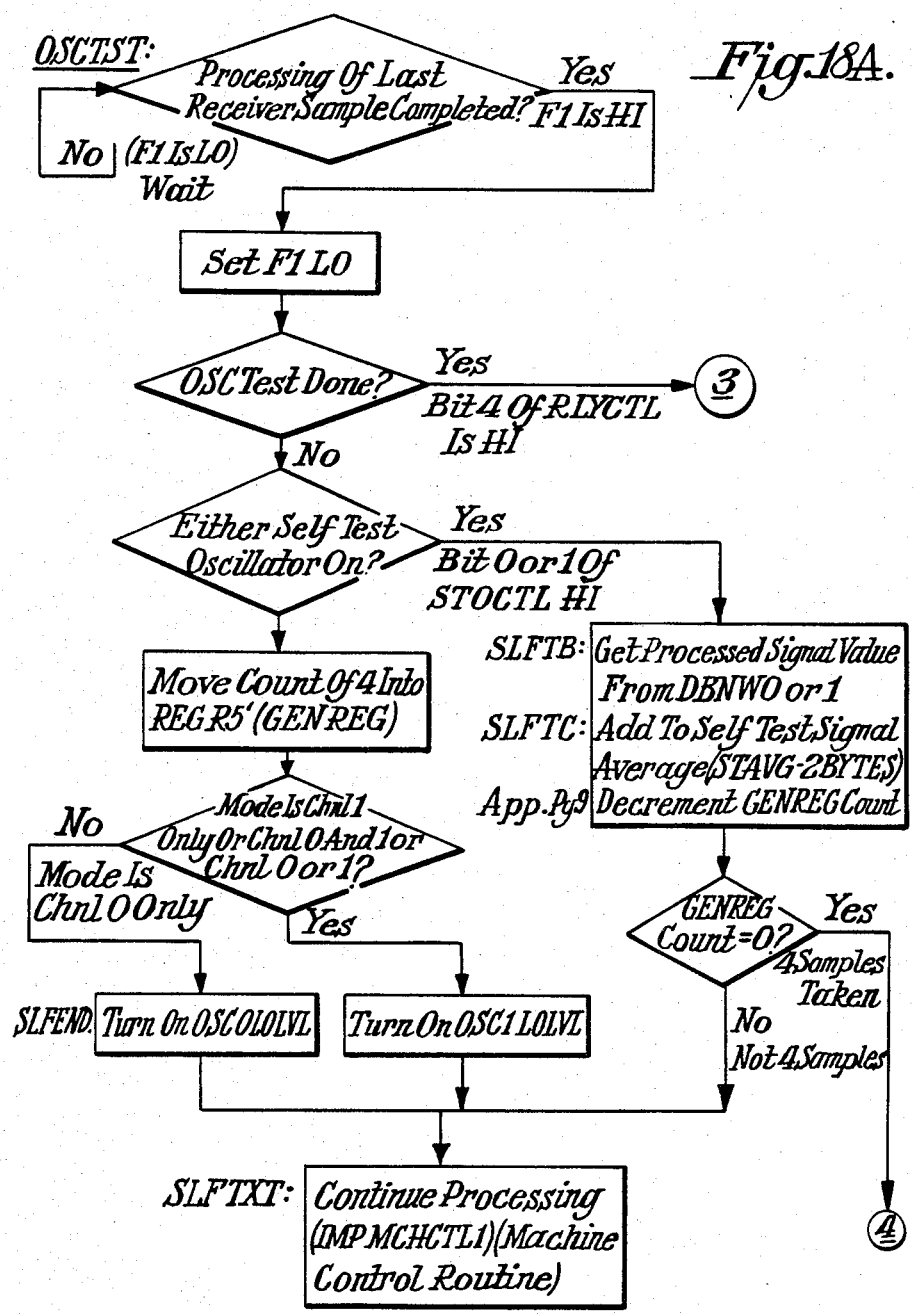
Figure 18D:
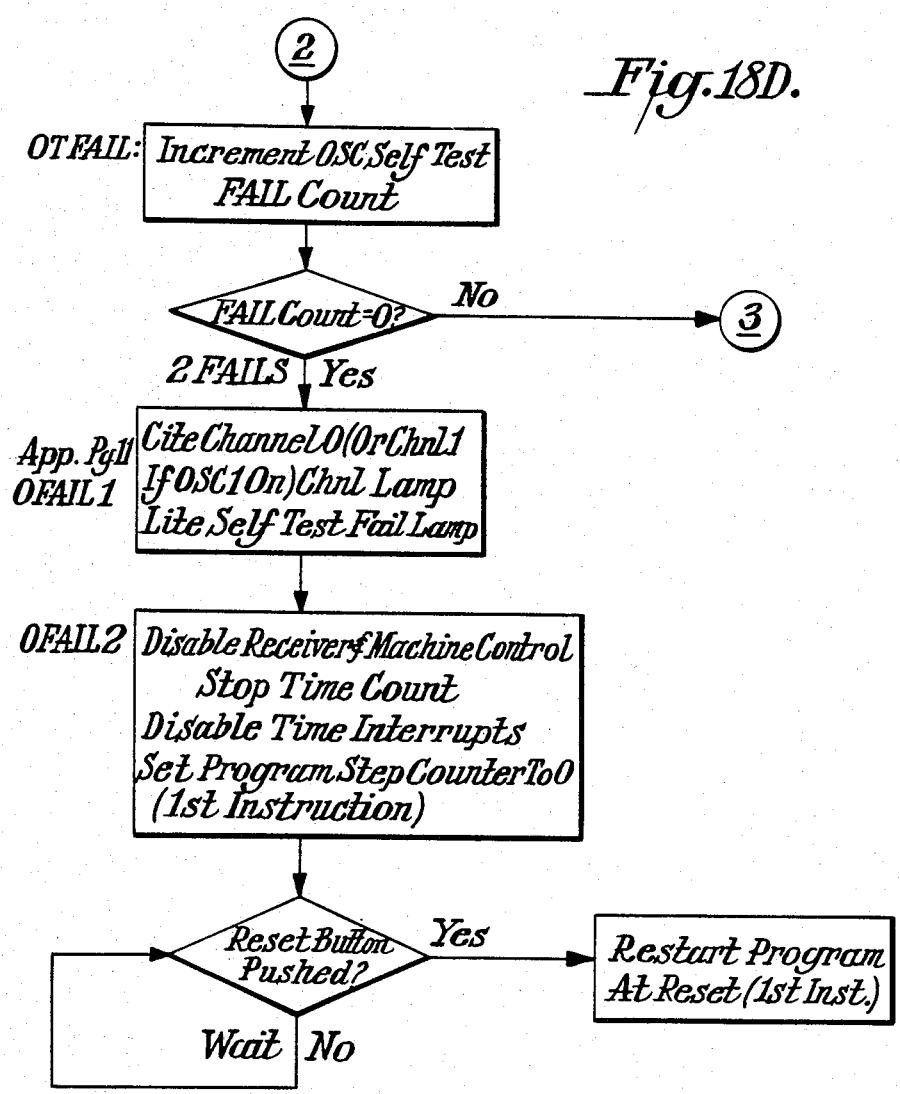

The SAFETY LEVEL condition is tested on each RETURN to the main program from the subroutine LKSYNC and specifically via the SAFETY subroutine. The SAFETY subroutine is shown in FIG. 17. This subroutine is executed only if the system control flag FO has been set to logic one by the routine ONETS (FIG. 16C). Recall that the flag FO is set to logic one only after ARMFLG indicator is set to logic one and ONETS is satisfied meaning that is the peak of the incoming modulation waveform. Should the flag FO be set and the peak average of the received signal be less than the threshold set by the potentiometer 352 (FIG. 8), safety control flag indicator SFTYFLG is set to logic zero. On the other hand, if two successive samples of the received signal, one period apart, are greater than or equal to the value set by the potentiometer 352, then SFTYFLG is set to logic one.

The microcomputer 460 also branches to a self-test routine when it is desired to verify system operation. This routine is shown in flow diagram form in FIG. 18 and at APP. PG. 8 through 11.

Those skilled in the art, having the benefit of the teachings hereinabove set forth may effect numerous modifications thereto. These modifications are to be construed as lying within the contemplation of the instant invention as defined in the appended claims.

```
;       TIMER INTERUPT ROUTINE
;
TIMER:  IN      A,P2
        JB7     TIMER1      ;START NEW SAMPLE IF RECEN HI
        JMP     TIMER2      ;
TIMER1: JMP     RECSTR      ;
;
;       SET-UP TO READ THIS RECEIVER SAMPLE
;
TIMER2: ORL     P2,#NOT RECEN   ;TURN OFF SAMPLE TO DETECTORS
        MOV     A,#TMBS2        ;SET-UP FOR 1.76 MS TIMER DELAY
        MOV     T,A
        MOV     ATOD,#4     ;POINT TO DETECTOR 0
        MOVX    A,@ATOD     ;START THE FIRST ATOD READ
        MOV     R0,#ADDATA+3    ;SET-UP DATA STORAGE POINTER
        EN      I           ;ENABLE FOR ATOD READ
        MOV     A,TMPA      ;RE-ESTABLISH THE ACCUMULAATOR
        RETR
;
;       START A NEW RECEIVER SAMPLE TIME
;
RECSTR: ORL     P2,#DETDMP      ;DUMP LAST SAMPLE
        MOV     A,#TMBS1        ;SET TIMER FOR .240 MS DELAY
        MOV     T,A
        ANL     P2,#RECEN       ;ENABLE THE DETECTORS
        ANL     P2,#NOT DETDMP  ;REMOVE THE DETECTOR DUMP SIGNAL
        MOV     R1,#CTLREG      ;POINT TO MACHINE CONTROL OUTPUT REG

MOV     R0,#RLYTMR      ;CHECK SELF TEST RELAY DEBOUNCE TIMER
        MOV     A,@R0           ;
        JZ      CK50MS          ;
        INC     @R0
;       SUBROUTINES TO COMPUTE RUNNING AVERAGE
;
CMPAVG: MOV     A,@R0
        INC     R0
        JZ      CMPAV1
        ADD     A,@R0
        MOV     @R0,A
        INC     R0
        MOV     A,#0FFH
```

```
            ADDC    A,@R0
            MOV     @R0,A
            DEC     R0
CMPAV1:     MOV     A,@R1
            ADD     A,@R0
            MOV     @R0,A
            INC     R0
            CLR     A
            ADDC    A,@R0
            MOV     @R0,A
            DEC     R0
            DEC     R0
            CPL     A
            MOV     @R0,A
            INC     R0
            MOV     A,@R0
            DEC     R0
            CPL     A
            XCH     A,@R0
CAVLP:      CLR     C
            RRC     A
            XCH     A,@R0
            RRC     A
            XCH     A,@R0
            DJNZ    GENCNT,CAVLP
            INC     @R0
            MOV     A,@R0
            RET

;           LOCK SUBROUTINES
;
;           R0 = DATA
;           R1 = RECFL
;
LKSYNC:     CLR     F0
            MOV     A,@R0       ;R0 = DATAX
            RLC     A           ;R1 = RECFLX
            MOV     @R0,A
            INC     R0
            MOV     A,@R0       ;R0 = SYNCX
            RL      A
            MOV     @R0,A       ;R0 = SYNCX
            JZ      BSYNC
            JB0     ONETS
            JB3     TOZRTS
            CPL     A
            JB7     BSYNC
RESYNC:     MOV     @R0,#0      ;R0 = SYNCX
            INC     R0          ;R0 = LKCNTX
            CALL    LCKDEC
BSYNC:      MOV     A,#(DATA0-RECFL0)
            ADD     A,R1        ;R1 = RECFLX
            MOV     R0,A        ;R0 = DATAX
            MOV     A,#1
            XRL     A,@R0
            ANL     A,#7
            JNZ     SYNRET
            INC     R0          ;R0 = SYNCX
            MOV     @R0,#80H
SYNRET:     RET
TOZRTS:     JMP     ZROTS
ONETS:      DEC     R0          ;R0 = DATAX
            MOV     A,@R0
            CPL     A
            INC     R0          ;R0 = SYNC0
            JB0     RESYNC
            MOV     A,R1
            INC     A
            MOV     R0,A        ;R0 = PKAVG
```

```
            MOV     A,#(DBNWO-RECFLO)
            ADD     A,R1
            XCH     A,R1        ;R1 = DBNWX
            MOV     TMPD,A      ;TMPD = RECFLX
            MOV     GENCNT,#4
            CALL    CMPAVG
            XCH     A,TMPD      ;TMPD = PKAVG
            MOV     R1,A        ;R1 = RECFLX
            ADD     A,#(ARMLVO-RECFLO)
            MOV     R0,A        ;R0 = ARMLVO
            MOV     A,@R1
            CPL     A
            JB0     ONEXIT      ;NO LOCK
            JB1     NOTARM      ;NO ARM
            MOV     A,@R0
            ADD     A,#-3
            ADD     A,TMPD
            JC      ONEXIT      ;IF CARRY CLR ARMFL
            CPL     F0
            RET
NOTARM:     MOV     A,@R0
            ADD     A,TMPD
            JC      ONEXIT      ;IF CARRY CLR ARMFL
            MOV     A,@R1
            ORL     A,#ARMFL
            MOV     @R1,A
            CPL     F0
            RET
ONEXIT:     MOV     A,@R1
            ANL     A,#NOT ARMFL
            MOV     @R1,A
            RET
ZROTS:      DEC     R0          ;R0 = DATAX
            MOV     A,@R0
            INC     R0          ;R0 = SYNCX
            JB0     TORESY
            MOV     A,R1        ;R1 = RECFLX
            DEC     A
            MOV     R0,A        ;R0 = LCKCNT
            JMP     LCKINC
TORESY:     JMP     RESYNC
;           R0 = LKCNT
;           R1 = RECFL
;
LCKINC:     MOV     A,@R0       ;R0 = LKCNTX
            JB5     LKRET
            INC     @R0
            MOV     A,#LCKHI
            ADD     A,@R0
            JNC     LKRET
            INC     R0          ;R0 = RECFLX
            MOV     A,@R0
            JB0     LKRET
            ORL     A,#LKFLG
            MOV     @R0,A
            INC     R0          ;R0 = PKAVGX
            JMP     AVGCLR
LKRET:      RET
;
AVGCLR:     CLR     A
            MOV     @R0,A
            INC     R0
            MOV     @R0,A
            INC     R0
            MOV     @R0,A
            RET
;
LCKDEC:     MOV     A,@R0       ;R0 = LKCNTX
            JZ      LKDCR
            DEC     A
```

```
                MOV     @R0,A
                ADD     A,#LCKLO
                JC      LKDCR
                MOV     A,@R1       ;R1 = RECFLX
                ANL     A,#NOT(LKFLG OR ARMFL)
                MOV     @R1,A
LKDCR:          RET

;
;               R1 = SFTLVX
;               TMPD = RECFLO
;
SAFTY:          JF0     SAFTY1
                RET
SAFTY1:         MOV     A,@R1       ;R1 = SFTLVX
                ADD     A,@R0       ;R0 = DBNWX
                MOV     A,TMPD
                MOV     R0,#CTLREG
                MOV     R1,A        ;R1 = RECFLX
                MOV     A,@R1
                JC      SFTSET
                ANL     A,#NOT (SFT2FL OR SFTYFL)
                MOV     @R1,A
SFTXIT:         RET
;
SFTSET:         XRL     A,#SFT2FL
                MOV     @R1,A
                JB3     SFTXIT
                ORL     A,#SFTYFL
                MOV     @R1,A
                RET

;               CHECK FOR SAFTY FOR TEST ROUTINES
;
SFTCHK:         MOV     A,@R0
                JB4     SFTCK1
                RET
SFTCK1:         MOV     A,@R1
                ORL     A,#SFTYLP
                MOV     @R1,A
                INC     R1
                MOV     @R1,#SFTYTM
                RET
LOC    OBJ              LINE        SOURCE STATEMENT

01B0   B84E             603 MAIN2:  MOV     R0,#RLYCTL      ;
01B2   F0               604         MOV     A,@R0           ;
01B3   4308             605         ORL     A,#ABORT        ;
01B5   A0               606         MOV     @R0,A           ;
01B6   E400             607 MAIN3:  JMP     OSCTST          ;
                        608 ;
01B8   B942             609 MAIN4:  MOV     R1,#CTLREG
01BA   F1               610         MOV     A,@R1
01BB   3C               611         MOVD    P4,A
01BC   47               612         SWAP    A
01BD   3D               613         MOVD    P5,A
01BE   72C4             614         JB3     MAIN5
01C0   8A20             615         ORL     P2,#NOT MCHEN2
01C2   24C6             616         JMP     MAIN6
01C4   9ADF             617 MAIN5:  ANL     P2,#MCHEN2
                        618
01C6   76C6             619 MAIN6:  JF1     MAIN6
01C8   B5               620         CPL     F1
01C9   46D1             621         JNT1    MAIN7           ; IF MANUAL RESET STOP
01CB   B847             622         MOV     R0,#MODE        ;   ELSE GET MODE DATA
01CD   F0               623         MOV     A,@R0           ;
01CE   0377             624         ADD     A,#LOW JMPTB    ;   OFFSET AND
01D0   B3               625         JMPP    @A              ;   JUMP TO PROPER ROU
                        626
01D1   2474             627 MAIN7:  JMP     REINIT          ;
```

```
                        628
                        629 ;           MODE JUMPS
                        630
01D3 8400               631 COONLY: JMP     R0ONLY
01D5 8421               632 C1ONLY: JMP     R1ONLY
01D7 8442               633 C0AND1: JMP     R0AND1
01D9 846B               634 C0OR1:  JMP     R0OR1
01DB 445C               635 C0STLO: JMP     R0STLO
01DD 4492               636 C0STHI: JMP     R0STHI
01DF 4477               637 C1STLO: JMP     R1STLO
01E1 44B2               638 C1STHI: JMP     R1STHI
01E3 24EB               639 C0ARSF: JMP     R0ARSF
01E5 4422               640 C1ARSF: JMP     R1ARSF
01E7 E4CB               641 C0SALT: JMP     OSCALT
01E9 84EF               642 COSO1H: JMP     OSO1HI
                        643 $EJECT
0700                    1494            ORG     700H
                        1495
                        1496 ;          OSC SELF TEST ROUTINE
                        1497
                        1498 ;          PASS LO LEVEL OSC TEST ONLY IF 4 SAMPLE AVG IS
                        1499 ;          EQUAL TO OR LESS THAN LO POT SETTING + 2 DB.
                        1500
                        1501 ;          PASS HI LEVEL OSC TEST ONLY IF 4 SAMPLE AVG IS
                        1502 ;          EQUAL TO OR LESS THAN HI POT SETTING + 2 DB AND EQ OR GT
                        1503 ;          SETTING - 2 DB.
0700 7600               1504 OSCTST: JF1     OSCTST              ; WAIT DATA OK
0702 B5                 1505         CPL     F1                  ;
0703 B84E               1506         MOV     R0,#RLYCTL          ; SKIP OSC TEST
0705 F0                 1507         MOV     A,@R0               ;  IF OSC TESTS
0706 9296               1508         JB4     SLTOK2              ; END FLAG IS SET
0708 B84A               1509         MOV     R0,#STOCTL
070A F0                 1510         MOV     A,@R0
070B 5303               1511         ANL     A,#SFTOS0 OR SFTOS1
070D 9627               1512         JNZ     SLFTB               ; JMP IF EITHER OSC IS ON
070F BD04               1513         MOV     GENREG,#4
0711 B947               1514         MOV     R1,#MODE
0713 F1                 1515         MOV     A,@R1
0714 3220               1516         JB1     SLFEN0
0716 37                 1517         CPL     A
0717 1220               1518         JB0     SLFEN0
0719 27                 1519         CLR     A
071A 4306               1520         ORL     A,#SFTOS1 OR SFTSLO
071C A0                 1521         MOV     @R0,A
071D 3E                 1522         MOVD    P6,A
071E A402               1523         JMP     MCHCT1
0720 27                 1524 SLFEN0: CLR     A
0721 4305               1525         ORL     A,#SFTOS0 OR SFTSLO
0723 A0                 1526         MOV     @R0,A
0724 3E                 1527         MOVD    P6,A
0725 A402               1528 SLFTXT: JMP     MCHCT1
0727 B824               1529 SLFTB:  MOV     R0,#DBNW0
0729 122D               1530         JB0     SLFTC
072B B833               1531         MOV     R0,#DBNW1
072D B948               1532 SLFTC:  MOV     R1,#STAVG
072F F0                 1533         MOV     A,@R0
0730 61                 1534         ADD     A,@R1
0731 A1                 1535         MOV     @R1,A
0732 27                 1536         CLR     A
0733 19                 1537         INC     R1
0734 71                 1538         ADDC    A,@R1
0735 A1                 1539         MOV     @R1,A
0736 ED25               1540         DJNZ    GENREG,SLFTXT
0738 97                 1541         CLR     C
0739 67                 1542         RRC     A
073A A1                 1543         MOV     @R1,A
073B C9                 1544         DEC     R1
073C F1                 1545         MOV     A,@R1
073D 67                 1546         RRC     A
073E A1                 1547         MOV     @R1,A
073F 19                 1548         INC     R1
```

```
0740 97      1549            CLR     C
0741 27      1550            CLR     A
0742 21      1551            XCH     A,@R1
0743 67      1552            RRC     A
0744 C9      1553            DEC     R1
0745 27      1554            CLR     A
0746 21      1555            XCH     A,@R1
0747 67      1556            RRC     A
0748 AB      1557            MOV     TMPD,A
0749 230D    1558            MOV     A,#SCLLV0-DBNW0
074B 68      1559            ADD     A,R0
074C A8      1560            MOV     R0,A        ;R0=SCLLVX
074D F0      1561            MOV     A,@R0
074E 37      1562            CPL     A
074F 17      1563            INC     A
0750 AA      1564            MOV     TMPA,A
0751 B94A    1565            MOV     R1,#STOCTL
0753 F1      1566            MOV     A,@R1
0754 525E    1567            JB2     SLFTD       ;JUMP IF LOW LEVEL
0756 18      1568            INC     R0          ;R0=SCHLVX
0757 F0      1569            MOV     A,@R0
0758 AA      1570            MOV     TMPA,A
0759 0304    1571            ADD     A,#4        ;2 DB
075B 6B      1572            ADD     A,TMPD
075C E648    1573            JNC     OTFAIL
075E FA      1574 SLFTD:     MOV     A,TMPA
075F 03FB    1575            ADD     A,#-5       ;2 DB
0761 6B      1576            ADD     A,TMPD
0762 F648    1577            JC      OTFAIL
0764 F1      1578            MOV     A,@R1
0765 5279    1579            JB2     SLFTE       ;JMP IF LO LVL
0767 3281    1580            JB1     SLFTOK      ;JMP IF OSC 1 ON
0769 B847    1581            MOV     R0,#MODE
076B F0      1582            MOV     A,@R0
076C C681    1583            JZ      SLFTOK
076E F1      1584            MOV     A,@R1
076F 53FE    1585            ANL     A,#NOT SFTOS0
0771 4306    1586            ORL     A,#SFTOS1 OR SFTSLO
0773 A1      1587            MOV     @R1,A
0774 3E      1588            MOVD    P6,A
0775 BD04    1589            MOV     GENREG,#4
0777 A402    1590            JMP     MCHCT1
0779 53FB    1591 SLFTE:     ANL     A,#NOT SFTSLO
077B A1      1592            MOV     @R1,A
077C 3E      1593            MOVD    P6,A
077D BD04    1594            MOV     GENREG,#4
077F A402    1595            JMP     MCHCT1
             1596 $EJECT
0781 B846    1597 SLFTOK:    MOV     R0,#STCNT
0783 B0FE    1598            MOV     @R0,#-2
0785 B84E    1599            MOV     R0,#RLYCTL  ; SET OSC TEST END FLAG
0787 F0      1600            MOV     A,@R0
0788 4310    1601            ORL     A,#ENDOT
078A A0      1602            MOV     @R0,A
078B F1      1603            MOV     A,@R1       ; OSC OFF
078C 53FC    1604            ANL     A,#NOT (SFTOS0 OR SFTOS1)
078E A1      1605            MOV     @R1,A
078F 3E      1606            MOVD    P6,A
0790 B842    1607            MOV     R0,#CTLREG  ;SELF TEST FAIL LITE OFF
0792 23FB    1608            MOV     A,#NOT STFLLP
0794 50      1609            ANL     A,@R0
0795 A0      1610            MOV     @R0,A
0796 B84E    1611 SLTOK2:    MOV     R0,#RLYCTL  ; IF OSC AND RLY TESTS
0798 F0      1612            MOV     A,@R0       ;     ARE DONE
0799 729D    1613            JB3     SLTOK3      ;SETUP FOR NEXT SELF TEST
079B A402    1614            JMP     MCHCT1
079D B020    1615 SLTOK3:    MOV     @R0,#NOT(K2ENZ OR K1ENZ)
079F B845    1616            MOV     R0,#STTMR   ;SET SELF TEST TIMER 5 SEC
07A1 B09C    1617            MOV     @R0,#TSTTM
07A3 B84C    1618            MOV     R0,#RSTMR   ; INCRM 30 SEC TMR
```

```
07A5  10            1619           INC    @R0
07A6  A402          1620           JMP    MCHCT1
                    1621
07A8  B846          1622  OTFAIL:  MOV    R0,#STCNT
07AA  10            1623           INC    @R0
07AB  F0            1624           MOV    A,@R0
07AC  9696          1625           JNZ    SLTOK2
07AE  F1            1626           MOV    A,@R1 ; IF TWICE FAILED (OR ONCE IF INITIALIZING)
07AF  B2B8          1627           JB1    OFAIL1
07B1  27            1628           CLR    A
07B2  4310          1629           ORL    A,#CALOLP
07B4  4304          1630           ORL    A,#STFLLP
07B6  E4BD          1631           JMP    OFAIL2
07B8  27            1632  OFAIL1:  CLR    A
07B9  4308          1633           ORL    A,#CAL1LP
07BB  4304          1634           ORL    A,#STFLLP
07BD  3C            1635  OFAIL2:  MOVD   P4,A
07BE  47            1636           SWAP   A
07BF  3D            1637           MOVD   P5,A
07C0  8AA0          1638           ORL    P2,#NOT(RECEN AND MCHEN2)
07C2  65            1639           STOP   TCNT
07C3  35            1640           DIS    TCNTI
07C4  2300          1641           MOV    A,#0
07C6  D7            1642           MOV    PSW,A
07C7  5607          1643  OTFLWT:  JT1    OTFLWT
07C9  0400          1644           JMP    RESET
                    1645  *EJECT
```

What is claimed is:

1. A machine tool safety system comprising:
an electric field generator adapted to be carried on a portion of the person of a machine tool operator for generating an electric field;
a capacitive receptor antenna mountable in a predetermined location with respect to a machine tool and cooperable with the electric field generator to form a capacitively coupled transmission arrangement operative to induce, by the action of the electric field through the capacitive coupling, a monotonically increasing electrical signal the magnitude of which is functionally related to the distance between the electric field generator and the capacitive receptor antenna; and
a signal processor connected to the capacitive receptor antenna and responsive to the signal induced in the capacitive receptor antenna by the electric field to generate an indication when the magnitude of the induced electrical signal exceeds a indication predetermined threshold, the first indicator being able to be used to permit safe operation of a machine tool.

2. The machine tool safety system of claim 1 wherein the signal processor is responsive to the signal induced in the capacitive receptor antenna to generate a second indication when the magnitude of the induced signal exceeds a second predetermined threshold, the second indication being able to be used to enable the operation of a machine tool.

3. The machine tool safety system of claim 2 wherein the signal processor includes a receiver; and wherein the electric field generated by the electric field generator is varied at a predetermined radio frequency and wherein
the receiver is tuned to respond to a signal induced in the capacitive receptor antenna at the predetermined radio frequency.

4. The machine tool safety system of claim 1 wherein the signal processor includes a receiver; and wherein the electric field generated by the electric field generator is varied at a predetermined radio frequency and wherein
the receiver is tuned to respond to a signal induced in the capacitive receptor antenna at the predetermined radio frequency.

5. The machine tool safety system of claim 3 wherein the electric field generator comprises a network for modulating the electric field generated thereby with a predetermined reference modulation characteristic such that the signal induced in the capacitive receptor antenna exhibits a corresponding modulation characteristic; and wherein
the signal processor comprises a network for comparing the modulation characteristic exhibited by the induced signal with the predetermined reference modulation characteristic and for allowing the generation of one of the indicators only if the modulation characteristic of the induced signal correlates to within a predetermined degree with the reference modulation characteristic.

6. The machine tool safety system of claim 5 wherein the modulation characteristic comparison network in the signal processor allows the generation of the other of the indicators only if the modulation characteristic of the induced signal correlates to within a predetermined degree with the reference modulation characteristic.

7. The machine tool safety system of claim 2 wherein the electric field generator comprises a network for modulating the electric field generated thereby with a predetermined reference modulation characteristic such that the signal induced in the capacitive receptor antenna exhibits a corresponding modulation characteristic; and wherein
the signal processor comprises a network for comparing the modulation characteristic exhibited by the induced signal with the predetermined reference modulation characteristic and for allowing the generation of one of the indicators only if the modulation characteristic of the induced signal correlates to within a predetermined degree with the reference modulation characteristic.

8. The machine tool safety system of claim 7 wherein the modulation characteristic comparison network in the signal processor allows the generation of the other of the indicators only if the modulation characteristic exhibited by the induced signal correlates to within a predetermined degree with the refrence modulation characteristic.

9. The machine tool safety system of claim 4 wherein the electric field generator comprises a network for modulating the electric field generated thereby with a predetermined reference modulation characteristic such that the signal induced in the capacitive receptor antenna exhibits a corresponding modulation characteristic; and wherein the signal processor comprises a network for comparing the modulation characteristic of the induced signal with the predetermined reference modulation characteristic and for allowing the generation of the indication only if the modulation characteristic of the induced signal correlates to within a predetermined degree with the reference modulation characteristic.

10. The machine tool safety system of claim 1 wherein the electric field generator comprises a network for modulating the electric field generated thereby with a predetermined reference modulation characteristic such that the signal induced in the capacitive receptor antenna exhibits a corresponding modulation characteristic; and wherein the signal processor comprises a network for comparing the modulation characteristic of the induced signal with the predetermined reference modulation characteristic and for allowing the generation of the indication only if the modulation characteristic of the induced signal correlates to within a predetermined degree with the reference modulation characteristic.

11. The machine tool safety system of claims 5, 6, 7, 8, 9 or 10 wherein the predetermined reference modulation characteristic comprises a predetermined recurrence rate and a predetermined duty cycle.

12. The machine tool safety system of claims 1 to 10 wherein the capacitive receptor antenna comprises a conductive member configured in a predetermined manner to provide a sensitivity zone of a predetermined corresponding shape about the capacitive receptor antenna.

13. The machine tool safety system of claim 1, 4, 9, or 10 wherein the capacitive receptor antenna comprises a generally annular housing mountable to a machine tool and a conductive member disposed within the housing, the conductive member being configured in a predetermined manner to provide a sensitivity zone of a predetermined corresponding shape about the capacitive receptor antenna, the distance that the outer boundary of the sensitivity zone lies from the conductive member being related to the magnitude of the first threshold.

14. A machine tool safety system of claim 2, 3, 5, 6, 7 or 8 wherein the capacitive receptor antenna comprises a generally annular housing mountable to a machine tool and a conductive member disposed within the housing, the conductive member being configured in a predetermined manner to provide a first and a second sensitivity zone each of a predetermined corresponding shape about the capacitive receptor antenna, the distance that the outer boundary of the first and second sensitivity zones lies from the conductive member being related respectively to the magnitude of the first and second thresholds.

15. The machine tool safety system of claim 1, 4, 9 or 10 wherein the capacitive receptor antenna comprises a conductive tube and first and second stub conductors electrically connected to the tube, the tube and stubs being configured in a predetermined manner to provide a sensitivity zone of a predetermined corresponding shape about the capacitive receptor antenna, the distance that the outer boundary of the sensitivity zone lies from the capacitive receptor antenna being functionally related to the magnitude of the first threshold.

16. The machine tool safety system of claim 2, 3, 5, 6, 7 or 8 wherein the capacitive receptor antenna comprises a conductive tube and first and second stub conductors electrically connected to the tube, the tube and stubs being configured in a predetermined manner to provide a first and a second sensitivity zone each of a predetermined corresponding shape about the capacitive receptor antenna, the distance that the outer boundary of the first and second sensitivity zones lies from the capacitive receptor antenna being related respectively to the magnitude of the first and second thresholds.

17. A machine tool safety system comprising:

an electric field generator adapted to generate an electric field that varies at a predetermined frequency, the electric field generator being sized so as to be carried on a portion of the person of a machine tool operator;

a capacitive receptor antenna mountable to the machine tool and cooperable with the electric field generator to form a capacitively coupled transmission arrangement operative to induce, by the action of the electric field through the capacitive coupling, a monotonically increasing electrical signal the magnitude of which is functionally related to the distance between the electric field generator and the capacitive receptor antenna; and a signal processor connected to the capacitive receptor antenna and responsive to the signal induced in the capacitive receptor antenna by the electric field to generate a first and a second indication when the magnitude of the induced signal respectively exceeds a first and a second threshold, the first and second indications being able to be used to permit safe operation of the machine tool, the signal processor including a receiver tuned to respond to the signal induced in the capacitive receptor antenna at the predetermined frequency.

18. The machine tool safety system of claim 17 wherein the electric field generator comprises a network for modulating the electric field generated thereby with a predetermined reference modulation characteristic such that the signal induced in the capacitive receptor antenna exhibits a corresponding modulation characteristic, and wherein the signal processor comprises a network for comparing the modulation characteristic exhibited by the induced signal with the predetermined reference modulation characteristic and for allowing the generation of the indications only if the modulation characteristic of the induced signal correlates to within a predetermined degree with the reference modulation characteristic.

19. The machine tool safety system of claim 18 wherein the capacitive receptor antenna comprises a conductive member configured in a predetermined manner to provide a sensitivity zone of a predetermined corresponding shape about the capacitive receptor antenna.

20. The machine tool safety system of claim 18 wherein the capacitive receptor antenna comprises a generally annular housing mountable to a machine tool and a conductive member disposed within the housing, the conductive member being configured in a predetermined manner to provide a first and a second sensitivity zone each of a predetermined corresponding shape about the capacitive receptor antenna, the distance that the outer boundary of the first and second sensitivity zones lies from the conductive member being related respectively to the magnitude of the first and second thresholds.

21. The machine tool safety system of claim 18 wherein the capacitive receptor antenna comprises a conductive tube and first and second stub conductors electrically connected to the tube, the tube and stubs being configured in a predetermined manner to provide a first and a second sensitivity zone each of a predetermined corresponding shape about the capacitive receptor antenna, the distance that the outer boundary of the first and second sensitivity zones lies from the capacitive receptor antenna being related respectively to the magnitude of the first and second thresholds.

* * * * *